United States Patent
Soundararajan et al.

(10) Patent No.: US 12,093,239 B2
(45) Date of Patent: Sep. 17, 2024

(54) HANDSHAKE PROTOCOL FOR EFFICIENT EXCHANGE OF TRANSACTIONAL INFORMATION FOR A HYBRID TRANSACTIONAL AND ANALYTICAL PROCESSING ARCHITECTURE

(71) Applicant: Amazon Technologies, Inc., Seattle, WA (US)

(72) Inventors: Gokul Soundararajan, San Jose, CA (US); Gopal Paliwal, Milpitas, CA (US); Punit Rajgaria, Saratoga, CA (US); Sanuj Basu, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 56 days.

(21) Appl. No.: 17/810,312

(22) Filed: Jun. 30, 2022

(65) Prior Publication Data

US 2024/0004860 A1    Jan. 4, 2024

(51) Int. Cl.
*G06F 16/23* (2019.01)
*G06F 16/22* (2019.01)
*G06F 16/242* (2019.01)

(52) U.S. Cl.
CPC ...... *G06F 16/2358* (2019.01); *G06F 16/2282* (2019.01); *G06F 16/2433* (2019.01)

(58) Field of Classification Search
CPC ............. G06F 16/2358; G06F 16/2433; G06F 16/2282
See application file for complete search history.

(56) References Cited

U.S. PATENT DOCUMENTS 10,002,175 B2    6/2018    Kemper et al.
10,346,434 B1 *  7/2019    Morkel ............... G06F 16/27
(Continued)

FOREIGN PATENT DOCUMENTS

EP    2467791          6/2012
EP    3961420 A1       3/2022

OTHER PUBLICATIONS

"Manassiev, et al., ""Exploiting Distributed Version Concurrency in a TransactionalMemory Cluster,"" PPoPP'06, 2006 ACM, pp. 1-11.".

(Continued)

*Primary Examiner* — Irete F Ehichioya
*Assistant Examiner* — Ken Hoang
(74) *Attorney, Agent, or Firm* — Alexander A. Knapp; Kowert, Hood, Munyon, Rankin & Goetzel, P.C.

(57) ABSTRACT

Methods for negotiating parameters for maintaining, at an analytical database, a replica of a transactional table, stored at a transactional database, are disclosed. By establishing parameters of said maintenance prior to commencing, the transactional database and the analytical database may remain only loosely coupled after completing the negotiation. The parameters of the negotiation may be stored in a location that is accessible to both the transactional database and the analytical database, such that the results of the negotiation may be accessed during the process of maintaining the replica. The negotiation may include a procedure to provide portions of a change-data-capture log, associated to the transactional table, to the analytical database via a transport mechanism such that the replica may be updated, in addition to a list of agreed upon data definition language commands that may be used in the portions of the change-data-capture log.

20 Claims, 16 Drawing Sheets

(56) References Cited

U.S. PATENT DOCUMENTS

| | | | |
|---|---|---|---|
| 10,372,926 | B1 | 8/2019 | Leshinsky et al. |
| 10,929,428 | B1 | 2/2021 | Brahmadesam |
| 11,200,332 | B2 | 12/2021 | Leshinsky et al. |
| 2005/0262097 | A1* | 11/2005 | Sim-Tang ............. G06F 16/125 |
| 2010/0191713 | A1 | 7/2010 | Lomet |
| 2011/0320403 | A1 | 12/2011 | O'Krafka et al. |
| 2013/0073513 | A1 | 3/2013 | Kemper et al. |
| 2015/0046413 | A1 | 2/2015 | Andrei |
| 2016/0299932 | A1 | 10/2016 | Pound et al. |
| 2018/0322149 | A1 | 11/2018 | Vermeulen et al. |
| 2019/0294204 | A1 | 9/2019 | Castro et al. |
| 2019/0324866 | A1 | 10/2019 | Bensberg et al. |
| 2019/0384775 | A1 | 12/2019 | Wen et al. |
| 2020/0210412 | A1 | 7/2020 | Van Gulik et al. |
| 2021/0382877 | A1 | 12/2021 | Li |
| 2022/0027372 | A1 | 1/2022 | Schreter |
| 2022/0100883 | A1 | 3/2022 | Eshinsky et al. |
| 2022/0171739 | A1 | 6/2022 | Xiang |
| 2022/0318223 | A1 | 10/2022 | Ahluwalia et al. |
| 2023/0062198 | A1* | 3/2023 | Chen ..................... G06F 16/278 |

OTHER PUBLICATIONS

U.S. Appl. No. 17/810,318, filed Jun. 30, 2022, Pandis, et al.
U.S. Appl. No. 17/810,314, filed Jun. 30, 2022, Pandis, et al.
U.S. Appl. No. 17/710,444, filed Mar. 31, 2022, Sreekantham, et al.
U.S. Appl. No. 17/710,459, filed Mar. 31, 2022, Papathanasiou, et al.
U.S. Appl. No. 17/710,476, filed Mar. 31, 2022, Papathanasiou, et al.
International Search Report and Written Opinion mailed Oct. 5, 2023 in PCT/US2023/069415, Amazon Technologies, Inc., pp. 1-13.

* cited by examiner

*Maintain a representation at an analytical database of portion(s) of a table, stored at a transactional database*
500

*Write, at the transactional database, transactional changes made to the table to a change-data-capture log*
502

*Make, via a transport mechanism, snapshots of segments of the portion(s) of the table accessible to the analytical database*
504

*Make, via a same or different transport mechanism, checkpoints, relative to the respective snapshots, accessible to the analytical database, wherein the checkpoints comprise respective portions of the transactional changes of the change-data-capture log*
506

*Store, at the analytical database, the respective snapshots and the checkpoints across one or more compute nodes of a node cluster of the analytical database*
508

*Commit the transactional changes of the respective checkpoints to the representation*
510

FIG. 5

Maintain a representation at an analytical database of portion(s) of a table, stored at a transactional database
1000

Receive respective snapshots of segments of the portion(s) of the table
1002

Receive checkpoints, comprising transactional changes that have been applied to the table, relative to the respective snapshots
1004

Implement the transactional changes, including insert events and delete events, of a given checkpoint to its respective snapshot
1006

Commit the insert events to the respective snapshot in transactional order
1008

Commit the delete events to a shadow table
1010

Responsive to the shadow table reaching a threshold limit, commit the committed delete events in the shadow table to the respective snapshot in transactional order
1012

| Column 1102 | Column 1104 | Column 1106 | Inserts tracking 1108 | Deletes tracking 1110 |
|---|---|---|---|---|
| Alpha | 1 | Value_1 | 1150 | 1160 |
| Alpha | 2 | Value_1 | 1155 | |
| Beta | 1 | Value_1 | 1160 | 1170 |
| Beta | 2 | Value_1 | 1165 | |

1112, 1114, 1116, 1118

Table A representation 1100

FIG. 11B shadow table 1130

| Primary key 1132 | Buffered deletes tracking 1134 |
|---|---|
| | |

FIG. 11C checkpoint 1140

~~Transaction 1150: insert row 'Alpha[1]|Value_1'~~
~~Transaction 1155: insert row 'Alpha[2]|Value_1'~~
~~Transaction 1160: update data item in Column 1102 of primary key row '[Alpha,1]' to 'Beta'~~
~~Transaction 1165: insert row 'Beta[2]|Value_1'~~
~~Transaction 1170: delete primary key row '[Beta,1]'~~
Transaction 1180: update all data items in Column 1106 to 'Value_2'
...

FIG. 11D

| Column 1144 | Column 1146 | Column 1148 |
|---|---|---|
| Alpha | 2 | Value_1 |
| Beta | 2 | Value_1 | transaction 1175
Table A view 1142

FIG. 12A

Table A representation 1200

| Column 1102 | Column 1104 | Column 1106 | Inserts tracking 1108 | Deletes tracking 1110 |
|---|---|---|---|---|
| Alpha | 1 | Value_1 | 1150 | 1160 |
| Alpha | 2 | Value_1 | 1155 | |
| Beta | 1 | Value_1 | 1160 | 1170 |
| Beta | 2 | Value_1 | 1165 | |
| Alpha | 2 | Value_2 | 1180 | |
| Beta | 2 | Value_2 | 1180 | |

1112 — Alpha,1
1114 — Alpha,2
1116 — Beta,1
1118 — Beta,2
1220 — Alpha,2
1222 — Beta,2

FIG. 12B shadow table 1230

| Primary key 1132 | Buffered deletes tracking 1134 |
|---|---|
| {Alpha,2} | 1180 |
| {Beta,2} | 1180 |

1236 → {Alpha,2}
1238 → {Beta,2}

FIG. 12C checkpoint 1140

~~Transaction 1150: insert row 'Alpha[1]Value_1'~~
~~Transaction 1155: insert row 'Alpha[2]Value_1'~~
~~Transaction 1160: update data item in Column 1102 of primary key row '{Alpha,1}' to 'Beta'~~
~~Transaction 1165: insert row 'Beta[2]Value_1'~~
~~Transaction 1170: delete primary key row '{Beta,1}'~~
~~Transaction 1180: update all data items in Column 1106 to 'Value_2'~~
...

FIG. 12D transaction 1181
Table A view 1242

| Column 1144 | Column 1146 | Column 1148 |
|---|---|---|
| Alpha | 2 | Value_2 |
| Beta | 2 | Value_2 |

FIG. 13A — Table A representation 1300

| | Column 1102 | Column 1104 | Column 1106 | Inserts tracking 1108 | Deletes tracking 1110 |
|---|---|---|---|---|---|
| 1112 | Alpha | 1 | Value_1 | 1150 | 1160 |
| 1314 | Alpha | 2 | Value_1 | 1155 | 1180 |
| 1116 | Beta | 1 | Value_1 | 1160 | 1170 |
| 1318 | Beta | 2 | Value_1 | 1165 | 1180 |
| 1220 | Alpha | 2 | Value_2 | 1180 | |
| 1222 | Beta | 2 | Value_2 | 1180 | |

FIG. 13B — shadow table 1330

| Primary key 1132 | Buffered deletes tracking 1134 |
|---|---|
| | |

FIG. 13C — checkpoint 1140

~~Transaction 1150: insert row 'Alpha[1][Value_1'~~
~~Transaction 1155: insert row 'Alpha[2][Value_1'~~
~~Transaction 1160: update data item in Column 1102 of primary key row '[Alpha,1]' to 'Beta'~~
~~Transaction 1165: insert row '[Beta,2][Value_1'~~
~~Transaction 1170: delete primary key row '[Beta,1]'~~
~~Transaction 1180: update all data items in Column 1106 to 'Value_2'~~
...

FIG. 13D — transaction 1181 Table A view 1342

| Column 1144 | Column 1146 | Column 1148 |
|---|---|---|
| Alpha | 2 | Value_2 |
| Beta | 2 | Value_2 |

HANDSHAKE PROTOCOL FOR EFFICIENT EXCHANGE OF TRANSACTIONAL INFORMATION FOR A HYBRID TRANSACTIONAL AND ANALYTICAL PROCESSING ARCHITECTURE

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information.

New technologies more and more seek to reduce both the complexity and storage requirements of maintaining data while simultaneously improving the efficiency of data processing and querying. Challenges in obtaining the right configuration of data storage, processing, and querying, such that these database systems may be efficiently configured to perform various functions for different workloads occurs frequently.

BRIEF DESCRIPTION OF THE DRAWINGS

FIG. 5 is a flow diagram illustrating a process of maintaining, within an analytical database system, a representation of portions of a transactional data table from a transactional database system, according to some embodiments.

FIG. 10 is a flow diagram illustrating a process of implementing transactional changes to a representation of a transactional table in which delete events are first buffered and committed to a shadow table before being applied and committed as a batch to the representation, according to some embodiments.

FIGS. 11A-D illustrate the state of a table representation maintained at an analytical database and a corresponding shadow table, checkpoint, and table as viewed by an external client of the analytical database just prior to the implementation of a given transaction number 1180, according to some embodiments.

FIGS. 12A-D illustrate the state of the table representation, shadow table, checkpoint, and table view of FIGS. 11A-D just after the implementation of transaction number 1180, according to some embodiments.

FIGS. 13A-D illustrate the state of the table representation, shadow table, checkpoint, and table view of FIGS. 11A-D at a point after the implementation of transaction number 1180, according to some embodiments.

Figure 1:
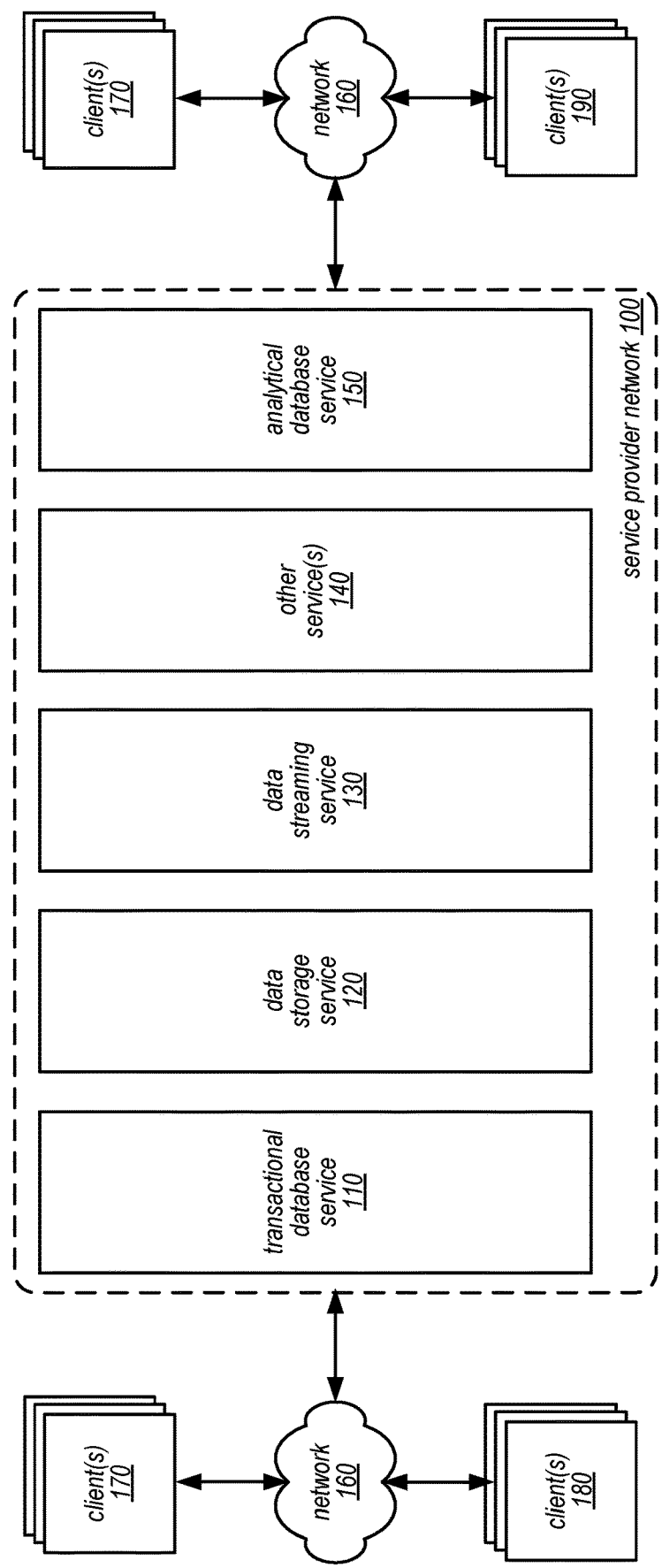
FIG. 1 illustrates a service provider network that includes at least a transactional database service and an analytical database service such that clients of the service provider network may both maintain transactional data and run analytical queries against the transactional data, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques pertaining to a hybrid transactional and analytical processing (HTAP) service are described. In some embodiments, a hybrid transactional and analytical processing system, which may implement at least a transactional database and an analytical database, may be used to maintain tables of transactional data at the transactional database, and maintain replicas of said tables at the analytical database. Such a hybrid transactional and analytical processing service may be optimized for both online transaction processing (OLTP) and online analytical processing (OLAP) related services, according to some embodiments. In order to maintain the replicas, or representations, of the transactional tables at the analytical database, a change-data-capture log of transactional changes made to the tables at the transactional database may be provided to the analytical database and incrementally applied and committed to the representations.

Running analytical queries against a transactional data store of the transactional database may impact the performance of the transactional queries, impact the performance of the computing resources of the transactional database, and, in some cases which may require leveraging materialized views and/or special indices, lead to a complex and/or challenging organization of database resources. In addition, scaling the structure of the transactional data stores of the transactional database such that they may be configured to treat analytical queries may be costly. On the other hand, "offloading" transactional data to an analytical database that is more optimized for analytical queries and analytical query management may be difficult to manage manually and/or lead to a lag (e.g., stale data). Techniques proposed herein, however, overcome these challenges by making use of the analytical database for running analytical queries against transactional data while minimizing the lag between the transactional data stored on the transactional database and the "offloaded" transactional data replications maintained on the analytical database, resulting in real-time analytics on data.

This specification continues with a general description of a service provider network that implements a hybrid transactional and analytical processing service, including a transactional database service and an analytical database service, that is configured to maintain transactional data, allow for querying against the transactional data, and support multi-version concurrency control (MVCC). Then, various examples of the hybrid transactional and analytical processing service, including different components/modules, or arrangements of components/module that may be employed as part of implementing the services are discussed. A number of different methods and techniques to maintain a representation in the analytical database service of a transactional table of the transactional database service are then discussed, some of which are illustrated in accompanying flowcharts. For example, methods and techniques for performing a handshake protocol that may define parameters and functionalities of the hybrid transactional and analytical processing service are described. In addition, methods and techniques for buffering delete events of transactional changes received by the analytical database such that they may be applied and committed to the representations as a background operation of the analytical database are described. Finally, a description of an example computing system upon which the various components, modules, systems, devices, and/or nodes may be implemented is provided. Various examples are provided throughout the specification. A person having ordinary skill in the art should also understand that the previous and following description of a hybrid transactional and analytical processing service is a logical description and thus is not to be construed as limiting as to the implementation of the hybrid transactional and analytical processing service, or portions thereof.

FIG. 1 illustrates a service provider network that includes at least a transactional database service and an analytical database service such that clients of the service provider network may both maintain transactional data and run analytical queries against the transactional data, according to some embodiments.

In some embodiments, a hybrid transactional and analytical processing service may be implemented within a service provider network, such as service provider network 100. In some embodiments, service provider network 100 may implement various computing resources or services, such as database service(s), (e.g., relational database services, non-relational database services, a map reduce service, a data warehouse service, data storage services, such as data storage service 120 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In some embodiments, a transactional database service, such as transactional database service 110, may be configured to store and maintain tables of transactional data items for client(s) of the transactional database service. For some clients of the transactional database service, further optimization of both transactional data processing and query processing against said transactional data may be made if tables of transactional data items are replicated and maintained in an analytical database service, such as analytical database service 150. In such a manner, processing and/or computing resources of the transactional database service may remain focused on processing transactional data without interference from potentially compute-intensive analytical query processing. By "outsourcing" such analytical query requests to an analytical database service, clients of the transactional database service may obtain near real-time analytical query results from the replicated tables in the analytical database service without limiting or taking away the computing resources of the transactional database service from transactional data processing.

In order to provide both initial replicas (e.g., snapshots) of the tables to the analytical database service and subsequent updates (e.g., checkpoints, or segments/portions of a change-data-capture log) that should be applied to the snapshots in order to maintain them at the analytical database service, one or more additional services of service provider network 100 may be used as transport mechanisms for the hybrid transactional and analytical processing service. For example, a data storage service, such as data storage service 120, may be used to provide access to such snapshots and/or checkpoints for the analytical database system. In addition to (or instead of) the data storage service, a data streaming service, such as data streaming service 130 may be used to stream the snapshots and/or checkpoints to the analytical database system. A person having ordinary skill in the art should understand that additional embodiments using other transport mechanisms may similarly result in the transport of snapshots and checkpoints from the transactional database to the analytical database, and may include the use of other service(s) 140 of service provider network 100.

As shown in the figure, multiple access points (e.g., client endpoints) may be used such that clients may access the different services of service provider network 100 more directly. For example, a client of clients 170 may have accounts with at least transactional database service 110 and analytical database service 150, and may be able to access these services of service provider network 110 through network 160. In some embodiments, a same or different network connection may be used at these different access points. Network 160 may represent the same network connection or multiple different network connections, according to some embodiments. For example, network 160 may generally encompass the various telecommunications networks and service providers that collectively implement the Internet. Network 160 may also include private networks such as local area networks (LANs) or wide area networks (WANs) as well as public or private wireless networks. For example, both a given client of clients 170 and/or 180 and the various network-based services of service provider network 100 may be respectively provisioned within enterprises having their own internal networks. In such an embodiment, network 160 may include the hardware (e.g., modems, routers, switches, load balancers, proxy servers, etc.) and software (e.g., protocol stacks, accounting software, firewall/security software, etc.) necessary to establish a networking link between the given client and the Internet as well as between the Internet and the various network-based services of service provider network 100. It is noted that in some embodiments, clients 170 and/or 180 may communicate with services of service provider network 100 using a private network rather than the public Internet. For example, clients 170, 180, and/or 190 may be provisioned within the same enterprise as various services of service provider network 100. In such a case, clients 170, 180, and/or 190 may communicate with the various services of service provider network 100 entirely through a private network 160 (e.g., a LAN or WAN that may use Internet-based communication protocols but which is not publicly accessible).

The systems described herein may, in some embodiments, implement a network-based services that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Figure 2:
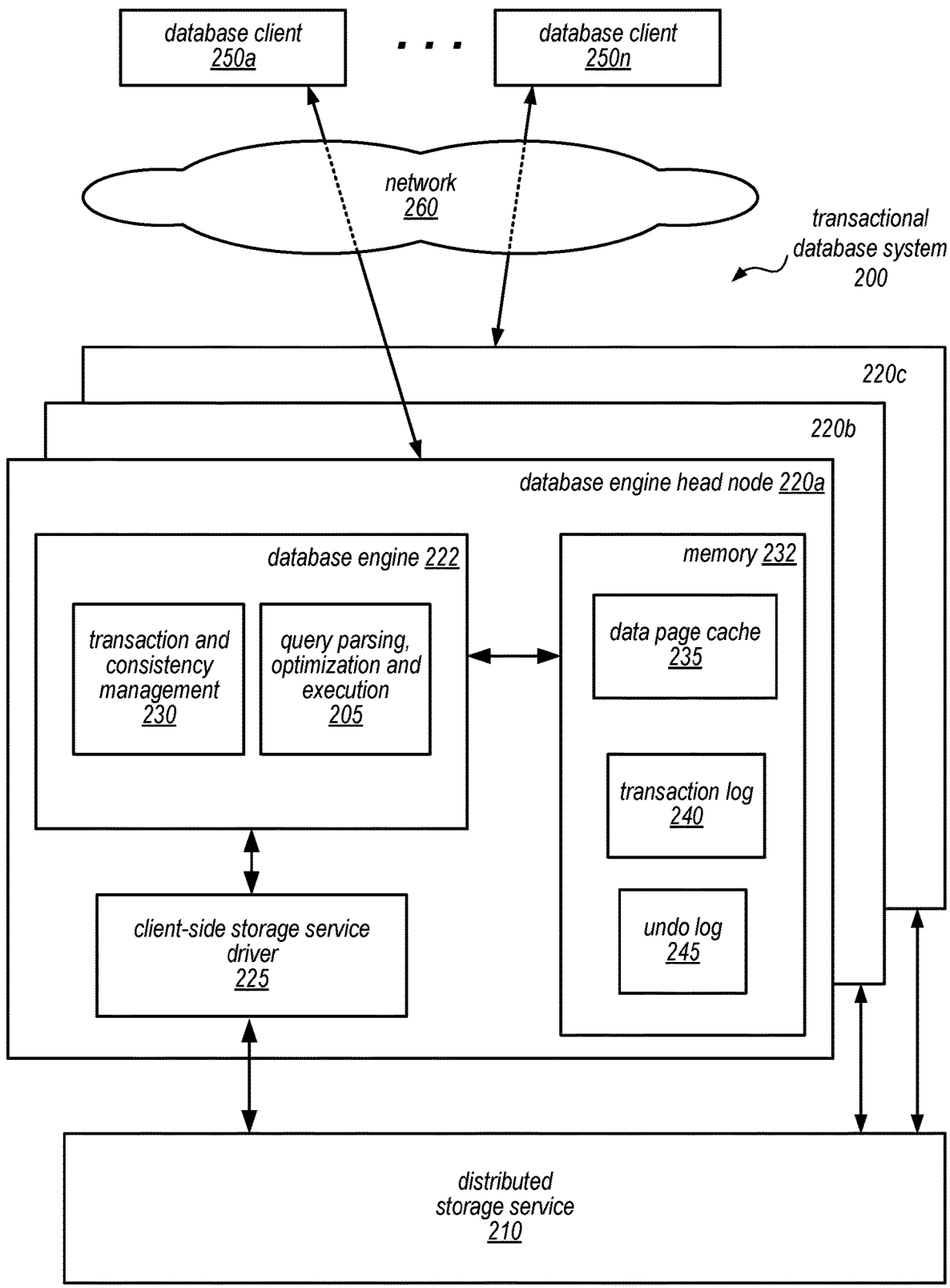
FIG. 2 illustrates various components of a transactional database system that includes a database engine and a separate distributed database storage service, according to some embodiments.

FIG. 2 illustrates various components of a transactional database system that includes a database engine and a separate distributed database storage service, according to some embodiments.

In some embodiments, transactional database system 200 described herein may, in some embodiments, implement a service-oriented architecture in which various functional components of the database system are intrinsically distributed. For example, transactional database system 200 may be organized such that the basic operations of a database (e.g., query processing, transaction management, caching and storage) are managed in tiers that may be individually and independently scalable. For example, in some embodiments, transactional database system 200 may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the transactional database system described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the transactional database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), with an IOPS rate associated with it (e.g., both peak and sustained), and/or user specified encryption. For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. The volume metadata may indicate which protection groups, and their respective storage nodes, maintain which partitions of the volume. For example, in some embodiments, in response to a request to make a change to a database, the client-side driver may be configured to determine the protection group, and its one or more nodes that are implementing the storage for the targeted data page, and to route the redo log record(s) specifying that change to those storage nodes. These read and write requests or separate synchronization requests may also include encrypted data which includes keys to decrypt data store of the protection group to which the storage node belongs. The storage nodes may then be responsible for applying the change specified in the redo log record to the targeted data page at some point in the future, including decrypting the received keys and using the received keys to decrypt stored data to apply the change specified in the redo log record. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records. Coalesce operations performed upon data pages may utilize received keys to access encrypted data pages and redo log records at the storage nodes.

As previously noted, in some embodiments, the storage tier of the transactional database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. In such embodiments, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing, which again may utilize a received encryption keys. Crash recovery may thereby be made parallel and distributed across nodes.

One embodiment of a service system architecture that may be configured to implement a network-based services-based transactional database service is illustrated in FIG. 2. In the illustrated embodiment, a number of clients (shown as clients 250a-250n) may be configured to interact with transactional database system 200 via a network 260. Distributed storage service 210 may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 14 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to a network-based services platform via network 260, including requests for database services. For example, a given client 250 may include a suitable version of a web browser, or may include a plug-in module or other type of code module configured to execute as an extension to or within an execution environment provided by a web browser. Alternatively, a client 250 (e.g., a database service clients 250a through 250n) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with the network-based services of service provider network 100. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services of service provider network 100 may be coordinated by client 250 and the operating system or file system on behalf of applications executing within the operating system environment.

Clients 250 may convey network-based services requests (e.g., read/restore data requests, etc.) to and receive responses from service provider network 100 via network 260. In various embodiments, network 260 may encompass any suitable combination of networking hardware and protocols necessary to establish network-based-based communications between clients 250 and transactional database system 200 of transactional database service 110.

Figure 3:
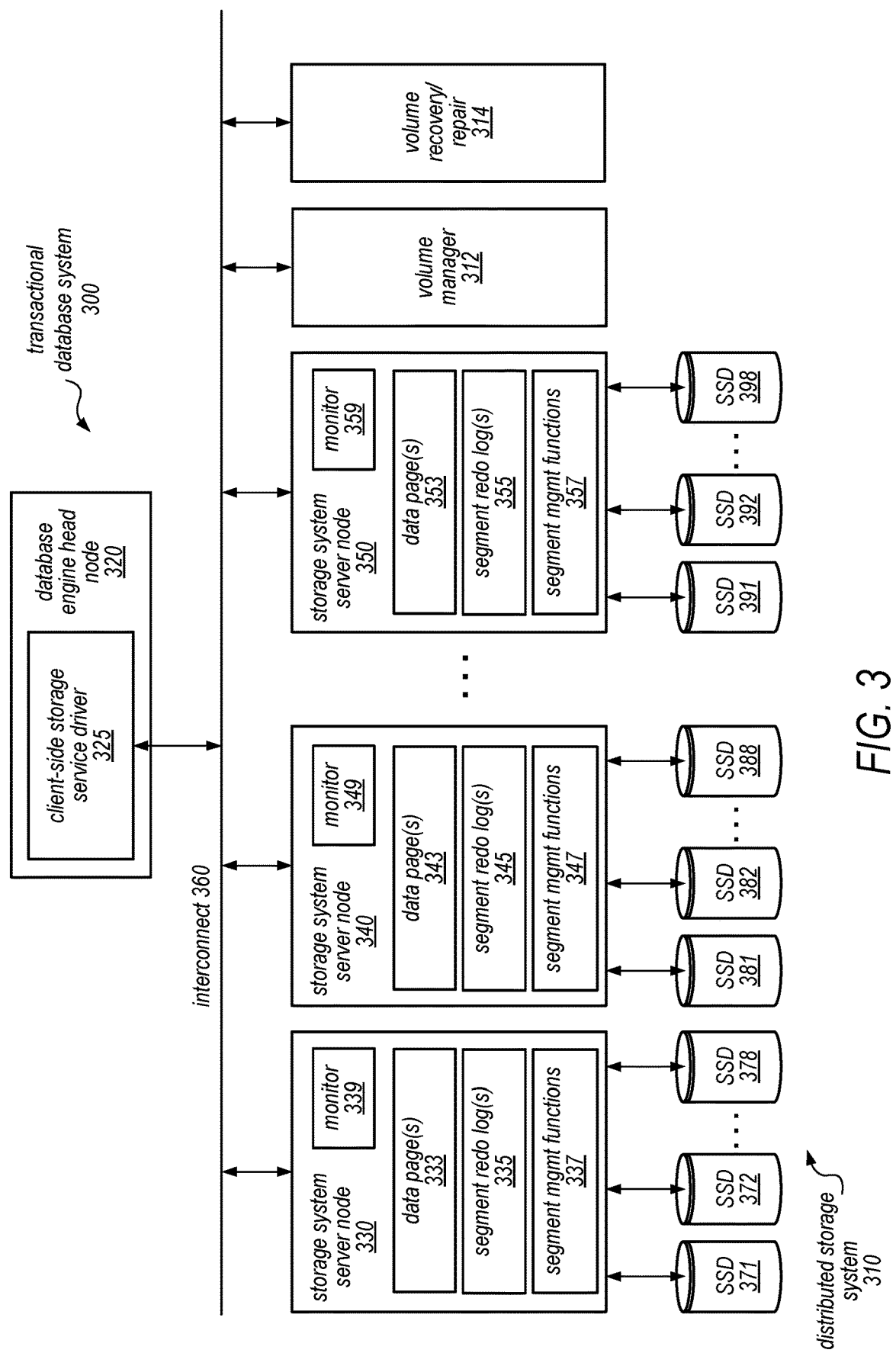
FIG. 3 illustrates a distributed storage system of a transactional database system, according to some embodiments.

Generally speaking, transactional database service 110 may be configured to implement one or more service endpoints for clients of service provider network 100 which may be configured to receive and process network-based services requests, such as requests to access data pages (or records thereof). For example, transactional database service 110 may include hardware and/or software configured to implement a particular endpoint, such that an HTTP-based network-based services request directed to that endpoint is properly received and processed. In some embodiments, transactional database service 110 may be implemented as a server system configured to receive network-based services requests from clients 250 and to forward them to components of transactional database system 200. In other embodiments, transactional database service 110 may be configured as a number of distinct systems (e.g., in a distributed topology, such as shown in FIGS. 2 and 3 for transactional database system 200) implementing load balancing and other request management features configured to dynamically manage large-scale network-based services request processing loads. In various embodiments, transactional database service 110 may be configured to support REST-style or document-based (e.g., SOAP-based) types of network-based services requests.

In addition to functioning as an addressable endpoint for clients' network-based services requests, in some embodiments, transactional database service 110 may implement various client management features. For example, transactional database service 110 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Transactional database service 110 may also implement financial accounting and billing systems, or may maintain a database of usage data that may be queried and processed by external systems for reporting and billing of client usage activity. In certain embodiments, transactional database service 110 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of transactional database service 110.

In some embodiments, transactional database service 110 may also implement user authentication and access control procedures. For example, for a given network-based services request to access a particular database, transactional database service 110 may be configured to ascertain whether the client 250 associated with the request is authorized to access the particular database. Transactional database service 110 may determine such authorization by, for example, evaluating an identity, password or other credential against credentials associated with the particular database, or evaluating the requested access to the particular database against an access control list for the particular database. For example, if a client 250 does not have sufficient credentials to access the particular database, transactional database service 110 may reject the corresponding network-based services request, for example by returning a response to the requesting client 250 indicating an error condition. Various access control policies may be stored as records or lists of access control information by transactional database service 110.

It is noted that while service provider network 100 may represent the primary interface through which clients 250 may access the features of transactional database system 200 that implements transactional database service 110, it need not represent the sole interface to such features. For example, an alternate API that may be distinct from a network-based services interface may be used to allow clients internal to the enterprise providing transactional database system 200 to bypass network-based services.

Although not illustrated, in various embodiments distributed storage service 210 may be configured to interface with backup data store, system, service, or device. Various data, such as data pages, log records, and/or any other data maintained by distributed storage service internal clients, such as transactional database service 110 or other virtual computing services, and/or external clients such as clients 250a through 250n, may be sent to a backup data store.

Note that in various embodiments, different storage policies may be implemented by transactional database service 110 and/or distributed storage service 210. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 210 may implement a higher durability for redo log records than for data pages.

In some embodiments, such as shown in FIG. 2, transactional database system 200 includes a respective database engine head node 220 for each of several databases and a distributed storage service 210 (which may or may not be visible to the clients of the database system, shown as database clients 250a-250n). As illustrated in this example, one or more of database clients 250a-250n may access a database engine head node 220 (e.g., head node 220a, head node 220b, or head node 220c, each of which is a component of a respective database instance) via network 260 (e.g., these components may be network-addressable and accessible to the database clients 250a-250n). However, distributed storage service 210, which may be employed by transactional database system 200 to store a database volume (such as data pages of one or more databases, as well as redo log records and/or other metadata associated therewith) on behalf of database clients 250a-250n, and to perform other functions of transactional database system 200 as described herein, may or may not be network-addressable and accessible to the storage clients 250a-250n, in different embodiments. For example, in some embodiments, distributed storage service 210 may perform various storage, access, change logging, recovery, log record manipulation, and/or space management operations in a manner that is invisible to storage clients 250a-250n.

As previously noted, each database instance may include a single database engine head node 220 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 2, a query parsing, optimization, and execution component 205 of database engine head node 220a may perform these functions for queries that are received from database client 250a and that target the database instance of which database engine head node 220a is a component. In some embodiments, query parsing, optimization, and execution component 205 may return query responses to database client 250a, which may include write acknowledgements, requested data pages (or portions thereof), error messages, and or other responses, as appropriate. As illustrated in this example, database engine head node 220a may also include a client-side storage service driver 225, which may route read requests and/or redo log records to various storage nodes within distributed storage service 210, receive write acknowledgements from distributed storage service 210, receive requested data pages from distributed storage service 210, and/or return data pages, error messages, or other responses to query parsing, optimization, and execution component 205 (which may, in turn, return them to database client 250a). Client-side storage service driver 225 may maintain mapping information about the database volume stored in distributed storage service 210, such that a particular protection group maintaining a partition of the database volume may be determined. Read requests and redo log records may then be routed to storage nodes that are members of the protection group according to the partition of user data to which the read request is directed or to which the redo log record pertains. Client-side storage service driver 225 may obtain encrypted keys for the different protection groups of a data volume from distributed storage service 210 and provide them to individual storage nodes of the respective protection groups so that the client-side storage service driver sends the key for each protection group to the storage nodes of the protection group when communicating with storage nodes of the protection group.

In this example, database engine head node 220a includes a data page cache 235, in which data pages that were recently accessed may be temporarily held. As illustrated in FIG. 2, database engine head node 220a may also include a transaction and consistency management component 230, which may be responsible for providing transactionality and consistency in the database instance of which database engine head node 220a is a component. For example, this component may be responsible for ensuring the Atomicity, Consistency, and Isolation properties of the database instance and the transactions that are directed that the database instance. As illustrated in FIG. 2, database engine head node 220a may also include a transaction log 240 and an undo log 245, which may be employed by transaction and consistency management component 230 to track the status of various transactions and roll back any locally cached results of transactions that do not commit.

Note that each of the other database engine head nodes 220 illustrated in FIG. 2 (e.g., 220b and 220c) may include similar components and may perform similar functions for queries received by one or more of database clients 250a-250n and directed to the respective database instances of which it is a component.

In some embodiments, the distributed storage system of distributed storage service 210 described herein (e.g., distributed storage system 310 shown in FIG. 3) may organize data in various logical data volumes, extents (which may include partitions of the user data space in the volume and a segmentation of the log for the volume) made durable among a protection group of storage nodes, segments (which may be data stored on an individual storage node of a protection group) and pages for storage on one or more storage nodes. For example, in some embodiments, each database is represented by a logical volume, and each logical volume is partitioned over a collection of storage nodes into extents. A protection group may be composed of different storage nodes in the distributed storage service that together make an extent durable. Multiple segments, each of which lives on a particular one of the storage nodes in a protection group, are used to make the extent durable.

In some embodiments, each data page is stored in a segment, such that each segment stores a collection of one or more data pages and a change log (also referred to as a redo log) (e.g., a log of redo log records) for each data page that it stores. Thus, change logs may be log records segmented to the protection group of which the segment is a member. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). If the data volume is encrypted, such a coalesce operation may need to obtain the encryption key to perform the coalesce operation. In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system such as distributed storage system 310, according to various embodiments.

Volume: A volume may be a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)) assigned from a log sequence number space. Each ULR may be persisted to one or more synchronous segments in the log-structured distributed store that form a Protection Group (PG) maintaining the partition of user data space (i.e. extent) to which the update indicate by the log record pertains in order to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment may be a limited-durability unit of storage assigned to a single storage node. Multiple segments may be implemented in a protection group to persist an extent. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page may be a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page may be a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Log records may include metadata, such as pointers or back links, that indicate a previous LSN for log record maintained at a particular segment and/or the previous LSN in the log sequence number space. Control Log Records (CLRs), which are generated by the storage system, may also contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record may be the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages may be the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page may be a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node may be a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance. Multiple storage nodes may together implement a protection group, in some embodiments.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

FIG. 3 illustrates a distributed storage system of a transactional database system, according to some embodiments.

In some embodiments, a distributed storage system of a transactional database system may resemble distributed storage system 310 of transactional database system 300, as shown in FIG. 3. In at least some embodiments, storage nodes 330-350 may store data for different clients as part of a multi-tenant storage service. In some embodiments, transactional database system 300 may be a client of distributed storage system 310, which communicates with a database engine head node 320 over interconnect 360. As in the example illustrated in FIG. 3, database engine head node 320 may include a client-side storage service driver 325. In this example, distributed storage system 310 includes multiple storage system server nodes (including those shown as 330, 340, and 350), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery (e.g., determining candidate log records for volume recovery), and/or space management (e.g., for a segment). Each storage system server node may also have multiple attached storage devices (e.g., SSDs) on which data blocks may be stored on behalf of clients (e.g., users, client applications, and/or database service subscribers). In some embodiments, storage system server nodes may provide multi-tenant storage, storing portions of different data volumes for different clients in the attached storage devices. Correspondingly, storage system server nodes may maintain numerous permanent keys for the different data volumes.

In some embodiments, as shown in FIG. 3, storage system server node 330 includes data page(s) 333, segment redo log(s) 335, segment management functions 337, monitor 349 and attached SSDs 371-378. Monitor 339 may report health statistics, performance measurements and any other information to volume manager 312 for distributed storage system management. A person having ordinary skill in the art should understand that the label "SSD" may or may not refer to a solid-state drive, but may more generally refer to a local block storage volume, regardless of its underlying hardware. Similarly, storage system server node 340 includes data page(s) 343, segment redo log(s) 345, segment management functions 347, and attached SSDs 381-388;

and storage system server node 350 includes data page(s) 353, segment redo log(s) 355, segment management functions 357, and attached SSDs 391-398.

In some embodiments, each of the storage system server nodes in distributed storage system 310 may implement a set of processes running on the node server's operating system that manage communication with database engine head node 320, e.g., to receive redo logs, send back data pages, etc. In some embodiments, all data blocks written to the distributed storage system may be backed up to long-term and/or archival storage (e.g., in a remote key-value durable backup storage system).

Distributed storage system 310 may also implement a storage control plane. Storage control plane may be one or more compute nodes configured to perform a variety of different storage system management functions. For example, storage control plane may implement a volume manager 312, which may be configured to maintain mapping information or other metadata for a volume, such as current volume state, current writer, truncation tables or other truncation information, or any other information for a volume as it is persisted in varying different, extents, segments, and protection groups. Volume manager 312 may be configured to communicate with a client of storage system 310, such as client-side driver 325 in order to "mount" or "open" the volume for the client, providing client-side driver 325 with mapping information, protection group policies, and various other information necessary to send write and read requests to storage nodes 330-350. Volume manager 312 may be configured to provide the maintained information, including keys, to storage clients, such as database engine head node 320 or client-side driver 325 or to other system components such as recovery service agents implemented for volume recovery/repair service 314. For example, volume manager 312 may provide a current volume state (e.g., clean, dirty or recovery), current epoch indicator and/or any other information about the data volume.

In some embodiments, distributed storage system may implement volume recovery/repair service 314. Volume recovery/repair service 314 may be configured to monitor or evaluate the current data volume state and based, at least in part, on the evaluation, direct recovery service agent(s) to perform a recovery operation with respect to a data volume. For example, volume recovery/repair 314 service may determine that the state of a particular data volume has remained in recovery state in excess of a time threshold and, in response direct one or more recovery service agent(s) to perform a recovery operation for the data volume.

In some embodiments, volume recovery/repair 314 may detect recovery events for a data volume. For example, volume recovery/repair 314 may receive an indication from client-side storage service driver 325 or database engine head node 320 that the data volume may not be re-opened or used again by a writing client. Additionally, recovery event detection module may determine other recovery events that may include detecting that a lease has expired for data volume client-side storage service driver 325 or database engine head node 320, or may receive a release request or command to evict the database engine head node 320 from another component of the database service 300. More generally, volume recovery/repair 314 may detect any event which may trigger or require the performance of a recovery operation.

Volume recovery/repair 314 may also implement recovery service agent(s) (not illustrated) which may be individual or collections of computing systems, nodes or devices that are configured to perform recovery operations. Recovery service agent(s) may be provisioned (from other computing resources of distributed storage system 310 or another system of service provider network 100) or directed to perform a recovery operation by volume recovery/repair 314. Recovery service agent(s) may abort the performance of a recovery operation, if it is determined that a recovery operation for the same data volume is already complete. In order to repair data volumes, may need to enable access to encrypted data for the data stored at the different storage nodes. Thus, similar to client-side storage service driver 325, recovery service agent(s) may receive an encrypted version of permanent key(s) to a data volume and send them to those storage nodes storing the data volume.

Figure 4A:
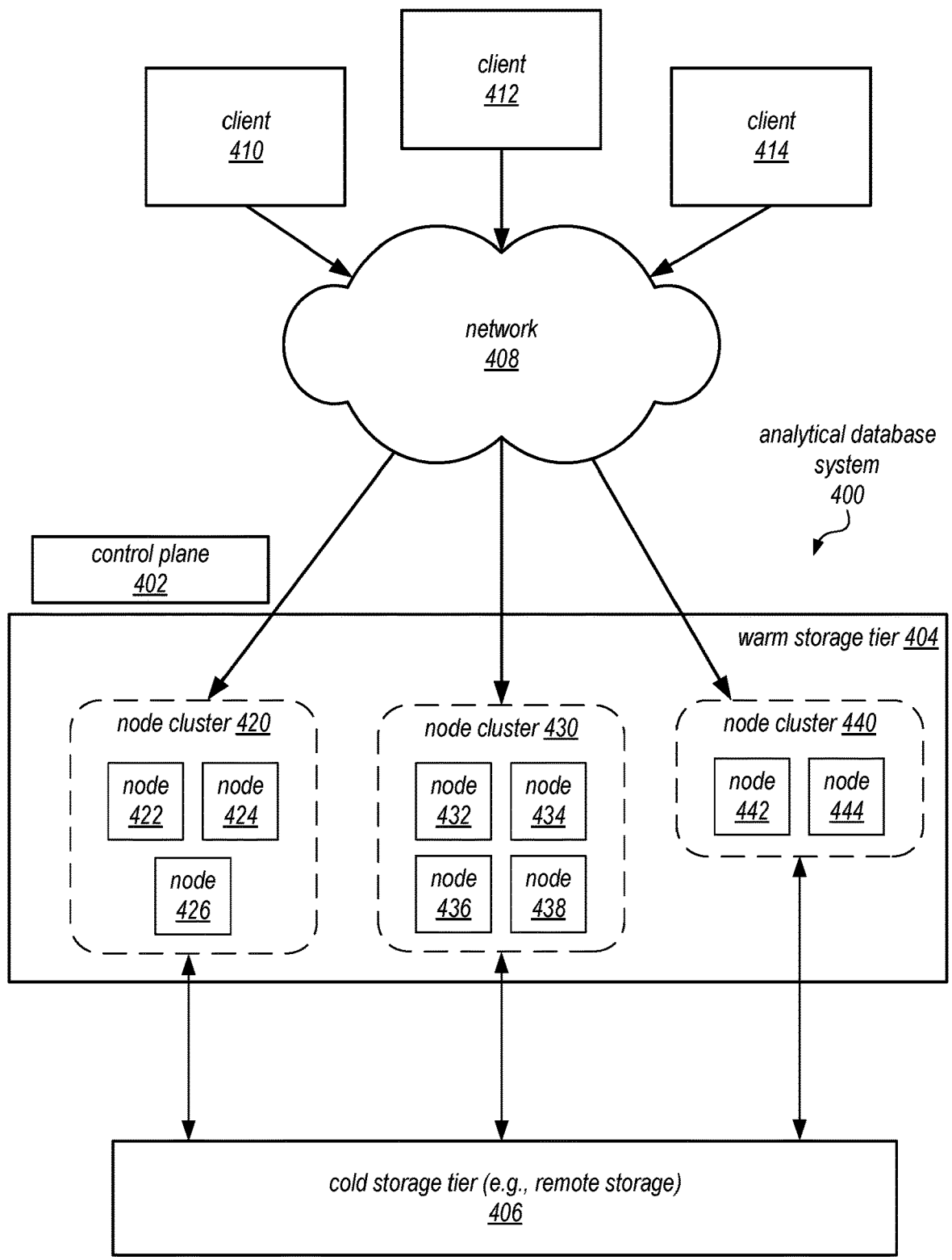
FIG. 4A illustrates various components of an analytical database system configured to use warm and cold storage tiers to store data blocks for clients of an analytical database service, wherein the warm storage tier comprises one or more node clusters associated with said clients, according to some embodiments.

FIG. 4A illustrates various components of an analytical database system configured to use warm and cold storage tiers to store data blocks for clients of an analytical database service, wherein the warm storage tier comprises one or more node clusters associated with said clients, according to some embodiments.

Figure 4B:
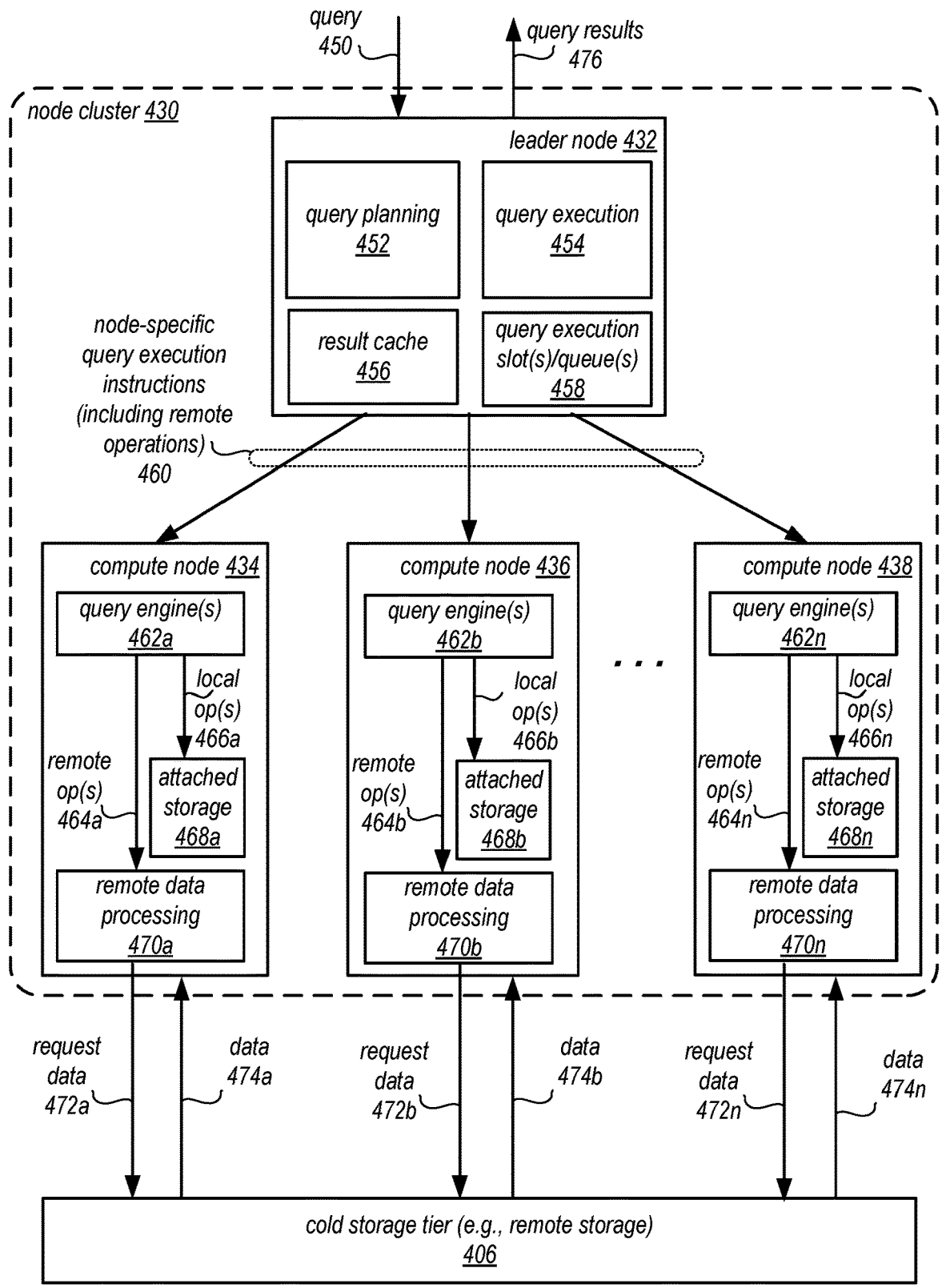
FIG. 4B illustrates an example of a node cluster of an analytical database system performing queries against transactional database data, according to some embodiments.

In various embodiments, the components illustrated in at least FIGS. 4A and 4B may be implemented directly within computer hardware, as instructions directly or indirectly executable by computer hardware (e.g., a microprocessor or computer system), or using a combination of these techniques. For example, the components of shown in FIGS. 4A and 4B may be implemented by a system that includes a number of computing nodes (or simply, nodes), each of which may be similar to the computer system embodiment illustrated in FIG. 14 and described below. In various embodiments, the functionality of a given system or service component (e.g., a component of analytical database system 400) may be implemented by a particular node or may be distributed across several nodes. In some embodiments, a given node may implement the functionality of more than one service system component (e.g., more than one data store component).

Analytical database service 150 may be various types of data processing services that perform general or specialized data processing functions (e.g., querying transactional data tables, anomaly detection, machine learning, data mining, big data querying, or any other type of data processing operation). For example, analytical database service 150 may include various types of database services (both relational and non-relational) for storing, querying, updating, and maintaining data such as transactional data tables. Such services may be enterprise-class database systems that are highly scalable and extensible. Queries may be directed to a database in analytical database service 150 that is distributed across multiple physical resources, and the analytical database system may be scaled up or down on an as needed basis.

Analytical database service 150 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, analytical database service 150 may implement, in some embodiments, a data warehouse service, that utilizes one or more of the additional services of service provider network 100, to execute portions of queries or other access requests with respect to data that is stored in a remote data store, such as cold storage tier 406 (or another data store within data storage services 120, etc.) to implement query processing for distributed data sets.

In at least some embodiments, analytical database service 150 may be a data warehouse service. Thus, in the description that follows, analytical database service 150 may be discussed according to the various features or components that may be implemented as part of a data warehouse service, including a control plane, such as control plane 402, and processing node clusters 420, 430, and 440. Note that such features or components may also be implemented in a similar fashion for other types of data processing services and thus the following examples may be applicable to other types of data processing services, such as database services. Analytical database service 150 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where analytical database service 150 is a data warehouse service, the data warehouse service may offer clients a variety of different data management services, according to their various needs. In some cases, clients may wish to store and maintain large amounts of data, such as transactional records, website analytics and metrics, sales records marketing, management reporting, business process management, budget forecasting, financial reporting, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system implemented as a data warehouse. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Figure 14:
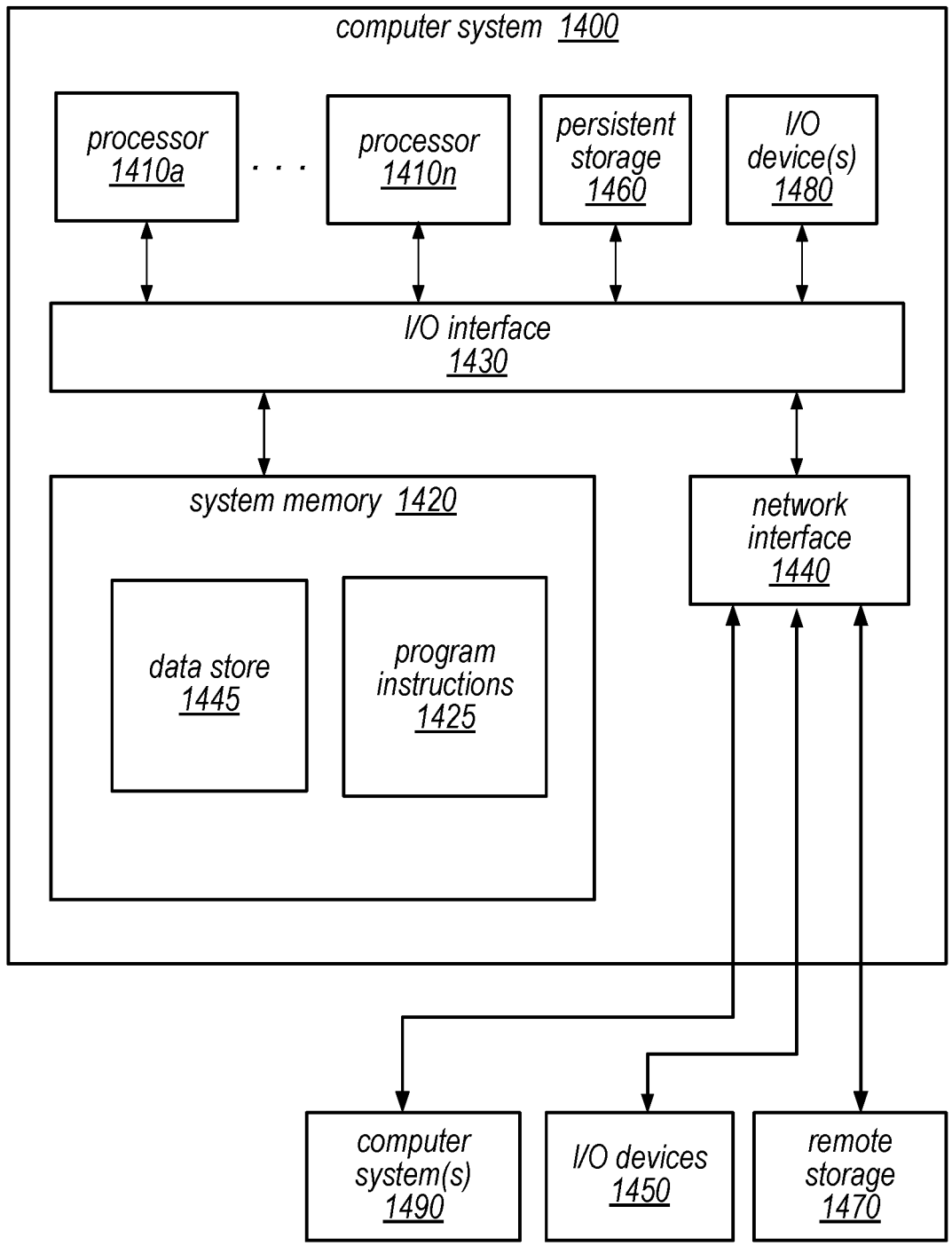
FIG. 14 is a block diagram illustrating an example computing device that may be used in at least some embodiments.

Analytical database system 400 may be implemented by a large collection of computing devices, such as customized or off-the-shelf computing systems, servers, or any other combination of computing systems or devices, such as the various types of systems 1400 described below with regard to FIG. 14. Different subsets of these computing devices may be controlled by a control plane of the analytical database system 400. Control plane 402, for example, may provide a cluster control interface to clients or users who wish to interact with the processing clusters, such as node cluster(s) 420, 430, and 440 managed by control plane 402. For example, control plane 402 may generate one or more graphical user interfaces (GUIs) for clients, which may then be utilized to select various control functions offered by the control interface for the processing clusters 420, 430, and 440 hosted in the data processing service 100. Control plane 402 may provide or implement access to various metrics collected for the performance of different features of data processing service 100, including processing cluster performance, in some embodiments.

As discussed above, various clients (or customers, organizations, entities, or users) may wish to store and manage data using a data processing service 100. Processing clusters 420, 430, and 440 may respond to various requests, including write/update/store requests (e.g., to write data into storage) or queries for data (e.g., such as a Server Query Language request (SQL) for particular data). For example, multiple users or clients may access a processing cluster to obtain data warehouse services.

Processing clusters, such as node clusters 420, 430, and 440, hosted by analytical database service 150 may provide an enterprise-class database query and management system that allows users to send data processing requests to be executed by the clusters, such as by sending a query. Processing clusters 420, 430, and 440 may perform data processing operations with respect to data stored locally in a processing cluster, as well as remotely stored data. For example, cold storage tier 406 may comprise backups or other data of a database stored in a cluster. In some embodiments, database data may not be stored locally in a processing cluster 420, 430, or 440 but instead may be stored in cold storage tier 406 (e.g., with data being partially or temporarily stored in processing cluster 420, 430, or 440 to perform queries). Queries sent to a processing cluster 420, 430, or 440 (or routed/redirect/assigned/allocated to processing cluster(s)) may be directed to local data stored in the processing cluster and/or remote data. Therefore, processing clusters may implement local data processing, such as local data processing, to plan and execute the performance of queries with respect to local data in the processing cluster, as well as a remote data processing client.

Analytical database system 400 of analytical database service 150 may implement different types or configurations of processing clusters. For example, different configurations 420, 430, or 440, may utilize various different configurations of computing resources, including, but not limited to, different numbers of computational nodes, different processing capabilities (e.g., processor size, power, custom or task-specific hardware, such as hardware accelerators to perform different operations, such as regular expression searching or other data processing operations), different amounts of memory, different networking capabilities, and so on. Thus, for some queries, different configurations of processing cluster 420, 430, 440, etc. may offer different execution times. As shown in FIG. 4A, node cluster 420 comprises nodes 422, 424, and 426, node cluster 430 comprises nodes 432, 434, 436, and 438, and node cluster 440 comprises node 442 and 444. Different configurations of processing clusters may be maintained in different pools of available processing clusters to be attached to a database. Attached processing clusters may then be made exclusively assigned or allocated for the use of performing queries to the attached database, in some embodiments. The number of processing clusters attached to a database may change over time according to the selection techniques discussed below.

In some embodiments, analytical database service 150 may have at least one processing cluster attached to a database, which may be the "primary cluster." Primary clusters may be reserved, allocated, permanent, or otherwise dedicated processing resources that store and/or provide access to a database for a client, in some embodiments. Primary clusters, however, may be changed. For example, a different processing cluster may be attached to a database and then designated as the primary database (e.g., allowing an old primary cluster to still be used as a "secondary" processing cluster or released to a pool of processing clusters made available to be attached to a different database). Techniques to resize or change to a different configuration of a primary cluster may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity in addition to that provided by a primary cluster. Control plane 402 may manage cluster pools by managing the size of cluster pools (e.g., by adding or removing processing clusters based on demand to use the different processing clusters).

As databases are created, updated, and/or otherwise modified, snapshots, copies, or other replicas of the database at different states may be stored in cold storage tier 406, according to some embodiments. For example, a leader node, or other processing cluster component, may implement a backup agent or system that creates and store database backups for a database to be stored as database data in cold storage tier 406 and/or data storage service 120. Database data may include user data (e.g., tables, rows, column values, etc.) and database metadata (e.g., information describing the tables which may be used to perform queries to a database, such as schema information, data distribution, range values or other content descriptors for filtering out portions of a table from a query, a superblock, etc.). A timestamp or other sequence value indicating the version of database data may be maintained in some embodiments, so that the latest database data may, for instance, be obtained by a processing cluster in order to perform queries. In at least some embodiments, database data (e.g., cold storage tier 406 data) may be treated as the authoritative version of data, and data stored in processing clusters 420, 430, and 440 for local processing (e.g., warm storage tier 404) as a cached version of data.

Cold storage tier 406 may implement different types of data stores for storing, accessing, and managing data on behalf of clients 410, 412, 414, etc. as a network-based service that enables clients 410, 412, 414, etc. to operate a data storage system in a cloud or network computing environment. Cold storage tier 406 may also include various kinds of object or file data stores for putting, updating, and getting data objects or files. For example, one cold storage tier 406 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, cold storage tier 406 may be treated as a data lake. For example, an organization may generate many different kinds of data, stored in one or multiple collections of data objects in a cold storage tier 406. The data objects in the collection may include related or homogenous data objects, such as database partitions of sales data, as well as unrelated or heterogeneous data objects, such as audio files and web site log files. Cold storage tier 406 may be accessed via programmatic interfaces (e.g., APIs) or graphical user interfaces. For example, format independent analytical database service 400 may access data objects stored in data storage services via the programmatic interfaces.

As described above with regard to clients 170-190 and 250, clients 410, 412, 414, etc. may encompass any type of client that can submit network-based requests to service provider network 200 via network 408 (e.g., also network 160 and 260), including requests for storage services (e.g., a request to query data analytical service 150, or a request to create, read, write, obtain, or modify data in cold storage tier 406 and/or data storage service 120, etc.).

FIG. 4B illustrates an example of a node cluster of an analytical database system performing queries against transactional database data, according to some embodiments. As illustrated in this example, a processing node cluster 430 may include a leader node 432 and compute nodes 434, 436, 438, etc., which may communicate with each other over an interconnect (not illustrated). Leader node 432 may implement query planning 452 to generate query plan(s), query execution 454 for executing queries on processing node cluster 430 that perform data processing that can utilize remote query processing resources for remotely stored data (e.g., by utilizing one or more query execution slot(s)/queue(s) 458). As described herein, each node in a primary processing cluster 430 may include attached storage, such as attached storage 468a, 468b, and 468n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 430 is a leader node as illustrated in FIG. 4B, but rather different nodes of the nodes in processing cluster 430 may act as a leader node or otherwise direct processing of queries to data stored in processing cluster 430. While nodes of processing cluster may be implemented on separate systems or devices, in at least some embodiments, some or all of processing cluster may be implemented as separate virtual nodes or instance on the same underlying hardware system (e.g., on a same server).

Leader node 432 may manage communications with clients, such as clients 410, 412, and 414 discussed above with regard to FIG. 4A. Leader node 432 may receive query 450 and return query results 476 to clients 410, 412, 414, etc. or to a proxy service (instead of communicating directly with a client application).

Leader node 432 may be a node that receives a query 450 from various client programs (e.g., applications) and/or subscribers (users) (either directly or routed to leader node 432 from a proxy service), then parses them and develops an execution plan (e.g., query plan(s)) to carry out the associated database operation(s)). More specifically, leader node 432 may develop the series of steps necessary to obtain results for the query. Query 450 may be directed to data that is stored both locally within a warm tier implementing using local storage of processing cluster 430 (e.g., at one or more of compute nodes 434, 436, or 438) and data stored remotely, such as in cold storage tier 406 (which may be implemented as part of data storage service 120, according to some embodiments). Leader node 432 may also manage the communications among compute nodes 434, 436, and 438 instructed to carry out database operations for data stored in the processing cluster 430. For example, node-specific query instructions 460 may be generated or compiled code by query execution 454 that is distributed by leader node 432 to various ones of the compute nodes 434, 436, and 438 to carry out the steps needed to perform query 450, including executing the code to generate intermediate results of query 450 at individual compute nodes may be sent back to the leader node 432. Leader node 432 may receive data and query responses or results from compute nodes 434, 436, and 438 in order to determine a final result 476 for query 450.

A database schema, data format and/or other metadata information for the data stored among the compute nodes, such as the data tables stored in the cluster, may be managed and stored by leader node 432. Query planning 452 may account for remotely stored data by generating node-specific query instructions that include remote operations to be directed by individual compute node(s). Although not illustrated, in some embodiments, a leader node may implement burst manager to send a query plan generated by query planning 452 to be performed at another attached processing cluster and return results received from the burst processing cluster to a client as part of results 476.

In at least some embodiments, a result cache 456 may be implemented as part of leader node 432. For example, as query results are generated, the results may also be stored in result cache 456 (or pointers to storage locations that store the results either in primary processing cluster 430 or in external storage locations), in some embodiments. Result cache 456 may be used instead of other processing cluster capacity, in some embodiments, by recognizing queries which would otherwise be sent to another attached processing cluster to be performed that have results stored in result cache 456. Various caching strategies (e.g., LRU, FIFO, etc.) for result cache 456 may be implemented, in some embodiments. Although not illustrated in FIG. 4B, result cache 456 could be stored in other storage systems (e.g., other storage services, such as a NoSQL database, and/or data storage service 120) and/or could store sub-query results.

Processing node cluster 430 may also include compute nodes, such as compute nodes 434, 436, and 438. Compute nodes, may for example, be implemented on servers or other computing devices, such as those described below with regard to computer system 1400 in FIG. 14, and each may include individual query processing "slices" defined, for example, for each core of a server's multi-core processor, one or more query processing engine(s), such as query engine(s) 462a, 462b, and 464n, to execute the instructions 460 or otherwise perform the portions of the query plan assigned to the compute node. Query engine(s) 462 may access a certain memory and disk space in order to process a portion of the workload for a query (or other database operation) that is sent to one or more of the compute nodes 434, 436, or 438. Query engine 462 may access attached storage, such as 468a, 468b, and 468n, to perform local operation(s), such as local operations 466a, 466b, and 466n. For example, query engine 462 may scan data in attached storage 468, access indexes, perform joins, semi joins, aggregations, or any other processing operation assigned to the compute node 434, 436, or 438.

Query engine 462a may also direct the execution of remote data processing operations, by providing remote operation(s), such as remote operations 464a, 464b, and 464n, to remote data processing clients, such as remote data processing 470a, 470b, and 470n. Remote data processing 470 may be implemented by a client library, plugin, driver or other component that sends request sub-queries to be performed by cold storage tier 406 or requests to for data, 472a, 472b, and 472n. As noted above, in some embodiments, Remote data processing 470 may read, process, or otherwise obtain data 474a, 474b, and 474n, in response from cold storage tier 406, which may further process, combine, and or include them with results of location operations 466.

Compute nodes 434, 436, and 438 may send intermediate results from queries back to leader node 432 for final result generation (e.g., combining, aggregating, modifying, joining, etc.). Remote data processing clients 470 may retry data requests 472 that do not return within a retry threshold.

Attached storage 468 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column-oriented data formats or other data formats).

Although FIGS. 4A and 4B have been described and illustrated in the context of a service provider network implementing an analytical database service, like a data warehousing service, the various components illustrated and described in FIGS. 4A and 4B may be easily applied to other database services that can utilize the methods and systems described herein. As such, FIGS. 4A and 4B are not intended to be limiting as to other embodiments maintaining and querying representations of transactional data tables for managed databases.

FIG. 5 is a flow diagram illustrating a process of maintaining, within an analytical database system, a representation of portions of a transactional data table from a transactional database system, according to some embodiments.

In some embodiments, maintaining representations of transactional tables at an analytical database, such as for the embodiments described herein, may include the following procedure steps. In the following embodiments shown in FIG. 5, it may be assumed that services of a provider network, such as transactional database service 110 and analytical database service 150 of service provider network 100, and the functionalities and techniques described for said services herein, may be used to implement a hybrid transactional and analytical processing service. However, a person having ordinary skill in the art should understand that other implementations and/or embodiments that fulfill the following procedure steps may also be incorporated to the description herein.

In block 500, portion(s) of a table that are being maintained at a transactional database, such as transactional database system 200 of transactional database service 110, may be replicated to an analytical database, such as analytical database system 400 of analytical database service 150, and subsequently maintained at the analytical database. In some embodiments, the means for maintaining a representation (e.g., a replica of portion(s) of a table from the transactional database) at the analytical database may use the procedure described in blocks 502-510.

Figure 6:
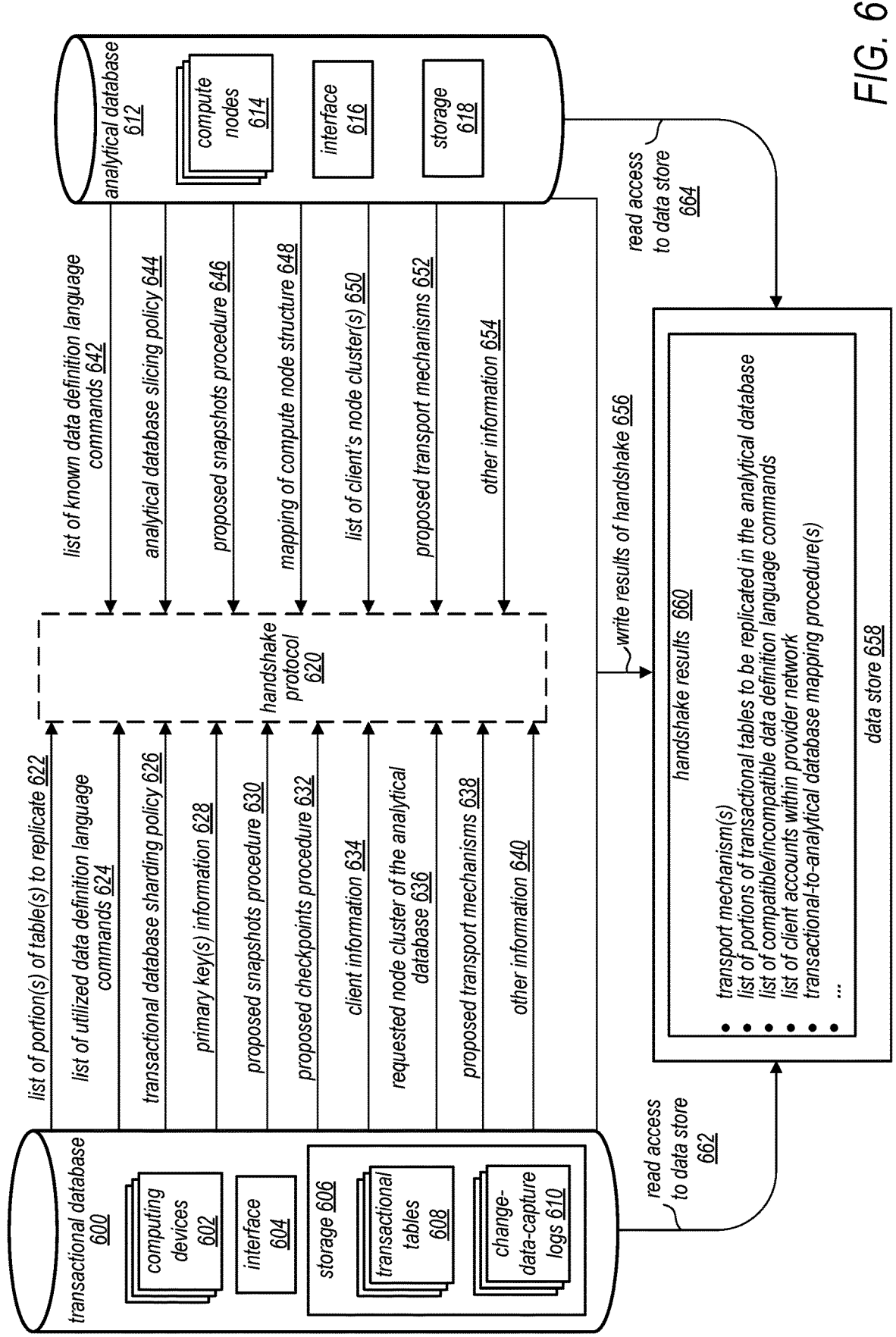
FIG. 6 illustrates the process of a handshake protocol, used to negotiate and define the configurations and parameters for maintaining, at an analytical database, a representation of a table stored in a transactional database, according to some embodiments.

In block 502, transactional changes that are made to a transactional table that is stored and maintained in the transactional database are written to a change-data-capture log, such as transaction log 240 (see also the description for at least change-data-capture logs 610 described herein with regard to FIG. 6). In block 504, portion(s) of the table that have been chosen to be replicated into the analytical database are partitioned into segments such that the portion(s) may be provided to the analytical database. In some embodiments, such segments may be referred to as snapshots, as they refer to the state of the table at a given moment (e.g., at a certain transaction number in embodiments in which the table contains transactional data). The snapshots may be provided to the analytical database via a transport mechanism. In some embodiments, the transport mechanism may resemble a data storage service, such as data storage service 120, or a data streaming service, such as data streaming service 130, of service provider network 100 (see also the description of transport mechanism 826 herein). A person having ordinary skill in the art should understand that "snapshots" may be plural or singular depending upon given embodiments. For example, if only one portion of one transactional table is being replicated to the analytical database and may be provided as a unit (e.g., without being further partitioned) via the transport mechanism, "snapshot" may refer to the sum of the segments, according to some embodiments. In a second example, if a given portion of a given transactional table is partitioned into more than one segment, "snapshots" may refer to the segments that sum to the portion of the table being provided via the transport mechanism. Additional example embodiments may be given and the above examples should not be misconstrued as restrictive.

In block 506, checkpoints are also provided to the analytical database. In some embodiments, checkpoints may resemble portions of transactional changes listed in the change-data-capture log of the transactional database for the given table portion(s) being replicated. In some embodiments in which more than one snapshot has been stored to respective compute nodes of a node cluster in the analytical database, respective checkpoints may also be partitioned based on this same mapping. In some embodiments, checkpoints may be provided to the analytical database by the same or different transport mechanism as the snapshots. For example, the snapshots may be provided via a data storage service, and the subsequent checkpoints may be streamed to the analytical database via a data streaming service.

In block 508, the snapshots and checkpoints are stored in the analytical database. In some embodiments, the snapshots and their related checkpoints may be stored across multiple compute nodes of a node cluster of the analytical database (e.g., compute nodes 434-438 of node cluster 430). The stored snapshots at the analytical database may now be referred to as the representation of the transactional portion(s) of the table maintained at the transactional database (see the description of transactional table representations 820 described herein).

In block 510, transactional changes that have been provided in the checkpoints are applied and committed to the representation (see also the description herein with regard to FIGS. 11A-13D), such that the representation is updated and maintained as a replica of the table stored in the transactional database. The process of receiving, applying, and committing additional checkpoints may continue as long as the hybrid transactional and analytical processing service maintains the representation in the analytical database. In addition, at any point after the storage of the first set of snapshots to the analytical database, a client of the hybrid transactional and analytical processing service may run a query against the transactional data in the representation, as the analytical database is configured to have simultaneous read/write properties (e.g., responding to the query and writing, applying, and/or committing new transactional changes to the representation).

FIG. 6 illustrates the process of a handshake protocol, used to negotiate and define the configurations and parameters for maintaining, at an analytical database, a representation of a table stored in a transactional database, according to some embodiments.

In some embodiments, a handshake protocol between the computing devices of the transactional database and the compute nodes of the analytical database may be used to determine the logistics of how a representation of a transactional table of the transactional database is going to be maintained at the analytical database. By determining such parameters and defining the procedures for providing and mapping the snapshots and checkpoints to compute nodes of a node cluster in the analytical database in advance of providing the initial snapshot(s), the transactional database and the analytical database may remain loosely coupled during the maintenance of the representation at the analytical database.

In some embodiments, transactional database 600 may resemble transactional database 200 and transactional database 300 of transactional database service 110, and their functionalities described herein. Computing devices 602 may resemble respective database engine head nodes 220. Interface 604 (e.g., SQL interface to the database system) may be used as a submission platform for database clients 250 providing incoming transactions to transactional database 600. Storage 606 may resemble distributed storage system 310 in which transactional tables 608 and corresponding change-data-capture logs 610 for transactional tables 608 are stored.

Analytical database 612 may resemble analytical database system 400 of analytical database service 150, according to some embodiments. Compute nodes 614 may represent compute nodes of a given node cluster, such as compute nodes 434-438 of node cluster 430. Interface 616 (e.g., SQL interface to the database system) may be used as a client endpoint for client(s) 170 and 190, wherein said clients may submit queries such as query 450, according to some embodiments. Storage 618 may resemble attached storage 468 of compute nodes 434-438, and/or remote storage such as cold storage tier 406. Storage 618 may be configured such that it may store one or more of snapshots of transactional tables 608 in order to maintain respective representation(s) at the analytical database.

In some embodiments, computing devices 602 and/or compute nodes 614 may initiate a handshake procedure in preparation for maintaining one or more of transactional tables 608 at analytical database 612. Maintaining the representations of transactional tables 608 may follow the methods described in at least blocks 500 and 1000, according to some embodiments. In order to efficiently and effectively maintain the representations of transactional tables 608 at analytical database 612, the handshake procedure may include negotiations between computing devices 602 and compute nodes 614 in order to determine data-type mappings, topology requirements, compatible/incompatible data definition language commands that may be written to change-data-capture logs 610 and/or interpreted by compute nodes 614. Negotiations 622-654 may represent examples of the information that may be exchanged and/or determined via computing devices 602 and compute nodes 614, according to some embodiments. A person having ordinary skill in the art should understand that handshake protocol 620 is meant to be a visual representation of negotiations between computing devices 602 at transactional database 600 and compute nodes 614 at analytical database 612. Other negotiations of handshake protocol 620 besides negotiations 622-654 may additionally be included in performing handshake protocol 620, and negotiations 622-654 are meant to be example embodiments of the methods and techniques described herein pertaining to performing a handshake protocol (see also the description of FIG. 7 herein). In addition, handshake protocol 620 may occur at computing devices 602, compute nodes 614, or at both computing devices 602 and compute nodes 614 through the interactions described in the following paragraphs. Furthermore, handshake protocol 620 may involve a first stage in which computing devices 602 provides information from all or parts of negotiations 622-640 to compute nodes 614, and then a second stage in which compute nodes 614 may respond with all or parts of negotiations 642-654, or vice versa. In other embodiments, handshake protocol 620 may resemble a more iterative process. For example, computing devices 602 may provide list of utilized data definition language commands 624, and compute nodes 614 may respond with list of known data definition language commands 642, and another iteration pertaining to data definition language commands may occur in order to determine and/or confirm the results of the handshake protocol pertaining to data definition language commands. Then, a similar process may occur for negotiations 626 and 644, etc., until the handshake protocol is complete.

In some embodiments, computing devices 602 may provide a list of portion(s) of table(s) to replicate 622, wherein the portions are portions of transactional tables 608 to be stored and maintained by storage 618 and compute nodes 614 at analytical database 612. By consequence of determining the portion(s) of transactional tables 608 to be maintained at analytical database 612, list of portion(s) of table(s) to replicate 622 may also be used to determine a list of the corresponding change-data-capture logs of change-data-capture logs 610 that will be sent as checkpoints in order to maintain the transactional table representations at analytical database 612, based on the information in negotiation 622. Furthermore, computing devices 602 may provide information about the primary keys that correspond to the list of portion(s) of table(s) to replicate 622 in primary key(s) information 628, according to some embodiments. In some embodiments, primary keys may correspond to unique row identifiers of respective transactional tables 608, such that respective rows may be identified by compute nodes 614 when applying transactional changes to representations of transactional tables 608. For example, a given transactional table of transactional tables 608 may contain an additional column of the table with respective row identifiers (e.g., row 1, row 2, row 3, etc. for each row in the given transactional table) that may be used as primary keys. In a second example, a concatenation of some subset of the columns for each row may be used as primary keys (e.g., a concatenation of the data items in column 1, column 2, and column 3 of the table). In a third example, primary keys of the given transactional table may be a concatenation of all columns in each row (e.g., a "hash" of all data items in each row). In some embodiments, computing devices 602 may use negotiation 628 to inform compute nodes 614 that there is no current primary keys scheme for the list of portion(s) of table(s) to replicate 622. In such embodiments, computing devices 602 and compute nodes 614 may determine, during handshake protocol 620, to use a concatenation of all columns in each row (e.g., the "hash" example described above) as the method of communicating information (e.g., transactional changes) about rows of the given transactional tables. In some embodiments, negotiation 628 may be referred to as determining a logic for generating respective primary keys, either via a provided primary key scheme or by determining to use a concatenation of all columns in each row, etc.

The results of the negotiation pertaining to primary key(s) information 628 may be used during the maintenance of the representations at analytical database 612, as, when providing checkpoints to compute nodes 614, the primary keys scheme may be trusted as an agreed upon form of communication when referencing respective rows to which compute nodes 614 should apply transactional changes of the checkpoints, according to some embodiments.

Computing devices 602 may also provide a list of data definition language commands 624 that are used when writing transactional changes to change-data-capture logs 610, and compute nodes 614 may provide a list of known data definition language commands 642. Negotiations 624 and 642 may be used to generate a list of compatible and/or incompatible data definition language commands, according to some embodiments. Such a list of compatible/incompatible data definition language commands may be used with regard to providing/receiving checkpoints of portions of change-data-capture logs 610 during the maintenance of representations of transactional tables 608 at analytical database 612. As the compatible/incompatible data definition language commands may be written to handshake results 660 at the end of handshake protocol 620, computing devices 602 may preemptively trigger a new snapshot of a given table (e.g., provide snapshots 828 discussed with regard to FIG. 8 below) if computing devices 602 determine that an incompatible data definition language command is included in a given checkpoint (or determine that there is a data definition language command in a given checkpoint that is not part of the list of compatible data definition language commands) during maintenance of the representations of transactional tables 608. Alternatively, compute nodes 614 may reactively request a new snapshot (e.g., request new snapshots 832 discussed with regard to FIG. 8 below) if compute nodes 614 determine that an incompatible data definition language command has been received as part of a given checkpoint.

In some embodiments, computing devices 602 may also provide transactional database sharding policy 626, in which computing devices 602 may propose a method of how to proportion the list of portion(s) of table(s) to replicate 622 for storage in storage 618 of analytical database 612. A person having ordinary skill in the art should understand that the storage capacity and/or the way that the storage capacity is distributed across SSDs 371-398 of distributed storage system 310 at transactional database 600 may differ from the storage capacity and/or the way that the storage capacity is distributed across attached storage 468 and cold storage tier 406 at analytical database 612, and therefore a negotiation pertaining to a mapping of the storage of transactional tables 608 at transactional database 600 to the storage of the representations of transactional tables 608 at analytical database 612 may be included in handshake protocol 620. As part of said negotiation, compute nodes 614 may additionally, or alternatively, propose analytical database slicing policy 644, pertaining to the storage capacity and/or the way that the storage capacity is distributed across attached storage 468 and cold storage tier 406 at analytical database 612.

Computing devices 602 may additionally provide a proposed snapshots procedure 630, which may also be based on other negotiations 622-654, according to some embodiments. For example, a mapping procedure determined via transactional database sharding policy 626 and analytical database slicing policy 664 may further determine the way that snapshots of portion(s) of table(s) to replicate 622 are proportioned (e.g., in preparation for storing and maintaining the portion(s) of the table(s) at multiple compute nodes of compute nodes 614). In a second example, proposed snapshots procedure 630 may be based on proposed transport mechanisms 638 and proposed transport mechanisms 652 (see continued description in the following paragraphs), in which partitioning and/or size constraints of the determined transport mechanisms may determine proposed snapshots procedure 630, according to some embodiments. Furthermore, compute nodes 614 may also or alternatively propose snapshots procedure 646 as part of the negotiations of handshake protocol 620. For example, depending upon how the representations of portion(s) of table(s) to replicate 622 are going to be distributed across compute nodes 614 of a given node cluster, compute nodes 614 may propose an optimized method of receiving snapshots from transactional database 600. Compute nodes 614 may also provide information pertaining to the structure of analytical database 612 via mapping of compute node structure 648 (e.g., compute nodes 614 may propose one or more node clusters that could be used to store and maintain list of portion(s) of table(s) to replicate 622). For example, mapping of compute node structure 648 may provide information about the number of compute nodes in a given node cluster, information about the storage capacity of said compute nodes, etc. Such information about the mapping of compute node structure 648 may be used to determine methods for providing snapshots and checkpoints to analytical database 612, according to some embodiments.

In some embodiments, computing devices 602 may propose checkpoints procedure 632 based at least in part on negotiations 630 and 646. Once a mapping of providing snapshots to compute nodes 614 of the given node cluster at analytical database 612 has been determined, computing devices 602 may propose a corresponding mapping for checkpoints. Such mapping for checkpoints may include methods for partitioning change-data-capture logs 610 into checkpoints that may be provided using the determined transport mechanisms (see description for proposed transport mechanisms 638 and proposed transport mechanisms 652 herein).

Handshake protocol 620 may also include negotiations pertaining to the client whose transactional tables of transactional tables 608 are going to be maintained at analytical database 612 via the methods and techniques described herein. For example, if list of portion(s) of table(s) to replicate 622 pertain to client 170 of transactional database service 110, client information 634 (e.g., a username, list of database engine head nodes 220 that pertain to said client, and/or account information with service provider network 100) for client 170 may be written to handshake results 660. Continuing with this example, client 170 may also be a client of analytical database service 150, in which case compute nodes 614 may provide list of client's node cluster(s) 650, according to some embodiments. Furthermore, in addition to (or in response to) determining that client 170 is a client of transactional database service 110 and of analytical database service 150, computing devices 602 may request a certain node cluster 636 from the list of client's node cluster(s) 650. A person having ordinary skill in the art should understand that negotiations 634, 636, and 650 may take place iteratively, in combination with one another, or separately during the overarching process of performing handshake protocol 620.

In some embodiments, one or more transport mechanisms may be used to provide snapshots and checkpoints to analytical database 612 (see the description for blocks 504 and 506 herein). As part of handshake protocol 620, computing devices 602 may propose transport mechanisms 638 and/or compute nodes 614 may propose transport mechanisms 652. For example, computing devices 602 may propose to provide snapshots (e.g., provide snapshots 828) via a given service of service provider network 100, such as data storage service 120. Compute nodes 614 may similarly propose to receive snapshots (e.g., receive snapshots 830) via a given service of service provider network 100 (e.g., a same or different transport mechanism than those proposed by proposed transport mechanisms 638) in proposed transport mechanisms 652. During negotiations 638 and 652, an agreed upon transport mechanism for providing snapshots to analytical database 612 may be determined and written to handshake results 660. In some embodiments, negotiations 638 and 652 may also be used to determine an agreed upon transport mechanism for providing checkpoints to analytical database 612 in which said transport mechanism may be the same or different transport mechanism determined for providing snapshots. For example, computing devices 602 and compute nodes 614 may determine, via negotiations 638 and 652, that snapshots may be provided to analytical database 612 via a first transport mechanism (e.g., data storage service 120), and that checkpoints may be provided to analytical database 612 via a second transport mechanism (e.g., data streaming service 130).

A person having ordinary skill in the art should understand that additional information (e.g., other information 640 and other information 654) may additionally be used to determine results of handshake protocol 620, and that negotiations 622-654 are meant to be example embodiments rather than an exhaustive list of negotiations that may take place during the performance of handshake protocol 620.

In some embodiments, after performing handshake protocol 620, results of the determined parameters for maintaining representations of transactional tables of transactional database 600 at analytical database 612 may be written, via write results of handshake 656, to a data store, such as data store 658, that is made accessible to transactional database 600 and analytical database 612. As discussed above, computing devices 602 may write a portion of handshake results 660 and compute nodes 614 may write an additional portion of handshake results via write results of handshake 656, resulting in handshake results 660, or, alternatively, either computing devices 602 or compute nodes 614 may write the results of handshake protocol 620, resulting in handshake results 660. Data store 658 may be located at a storage that is accessible to transactional database 600 and analytical database 612. For example, data store 658 may be located in a given storage of data storage service 120, according to some embodiments. In a second example, data store 658 may be located in storage of transactional database service 110, and data store 658 may be made accessible to analytical database service 150 such that read access is given to both transactional database 600 and analytical database 612, according to some embodiments.

As shown in FIG. 6, transactional database 600 may have read access to data store 662 and analytical database 612 may have read access to data store 664. Read access to data store 662 and 664 may allow computing devices 602 and compute nodes 614 to refer to handshake results 660 during the process of maintaining representations of transactional tables 608 at analytical database 612, according to some embodiments. For example, computing devices 602 may use handshake results 660 to verify that transactional changes in a given checkpoint that it will provide to analytical database 612 (e.g., via provide checkpoints 834) do not contain incompatible data definition language commands listed in handshake results 660. In a second example, compute nodes 614 may use handshake results 660 to verify the determined transport mechanism by which analytical database 612 may expect to receive snapshots by (e.g., via receive snapshots 830), according to some embodiments. Such example embodiments describe the "loose coupling" of transactional database 600 with analytical database 612 after the completion of handshake protocol 620. By establishing standard processes and procedures for maintaining representations of transactional tables at analytical database 612 during handshake protocol 620, subsequent processes (e.g., provide snapshots 828, provide checkpoints 834, request new snapshots 832, request new checkpoints 838, etc.) may be automated.

Furthermore, determined results of handshake results 660 may not be edited and/or written to by computing devices 602 or compute nodes 614 via read access to data store 662 or 664, according to some embodiments. In some embodiments, updates or changes to the structure and/or configurations of transactional database 600, analytical database 612, and/or any other services of service provider network 100 that are utilized as transport mechanisms (e.g., data storage service 120, data streaming service 130, etc.) may cause handshake results 660 to become out-of-date. In some embodiments in which it is determined that one or more of the determined results of handshake results 660 should be updated or changed, either computing devices 602, compute nodes 614, or both computing devices 602 and compute nodes 614 may re-initiate a new handshake protocol 620. One or more of the determined results may then be updated, modified, or changed based on performing the new handshake protocol 620, and handshake results 660 may be overwritten by updated determined results of the new handshake protocol 620, according to some embodiments.

Figure 7:
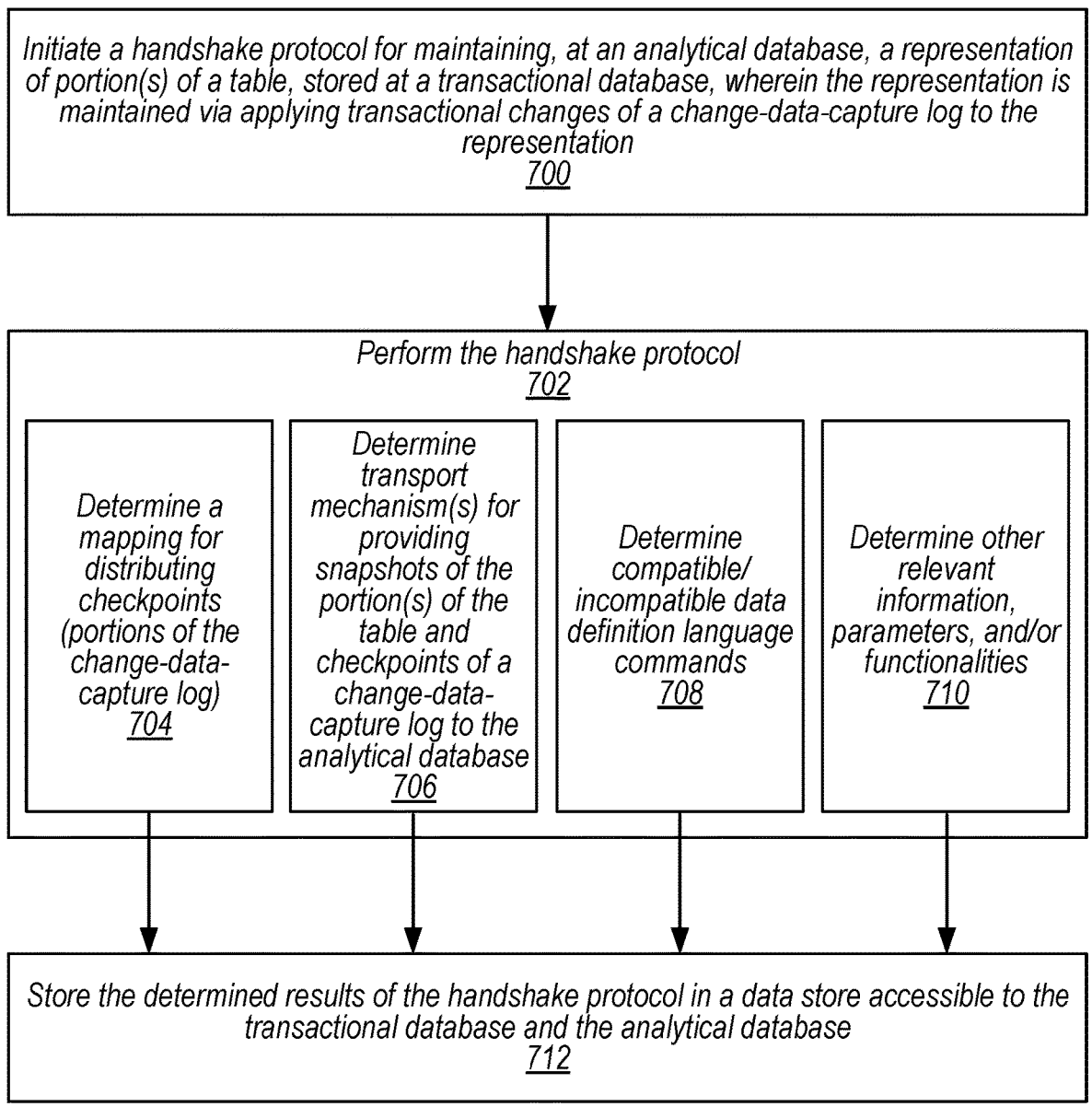
FIG. 7 is a flow diagram illustrating a process of initiating and performing a handshake protocol, used to negotiate and define the configurations and parameters for maintaining, at an analytical database, a representation of a table stored in a transactional database, according to some embodiments.

FIG. 7 is a flow diagram illustrating a process of initiating and performing a handshake protocol, used to negotiate and define the configurations and parameters for maintaining, at an analytical database, a representation of a table stored in a transactional database, according to some embodiments.

In some embodiments, the methods and techniques for performing handshake protocol 620 may resemble the embodiments shown in FIG. 7 via blocks 700-712. In block 700, a handshake protocol may be initiated in order to determine parameters for maintaining representations of transactional tables of the transactional database at the analytical database, according to some embodiments. As described above with regard to FIG. 6, the handshake protocol may be initiated by either the transactional database side of the hybrid transactional and analytical processing service, the analytical database side, or both. In block 702, the handshake protocol is performed. Blocks 704-710 may represent embodiments of negotiations that may take place during performance of the handshake protocol, according to some embodiments. Blocks 704-710 are not meant to be an exhaustive list of negotiations, and additional negotiations not shown in FIG. 7 may take place during performance of the handshake protocol (e.g., block 702).

In block 704, a mapping for distributing checkpoints across compute nodes of a given node cluster of the analytical database may be determined. In some embodiments, block 704 may resemble at least negotiations 632 and 648 and their descriptions herein. In block 706, one or more transport mechanisms for providing snapshots and checkpoints to the analytical database may be determined. In some embodiments, block 706 may resemble at least negotiations 638 and 652 and their descriptions herein. In block 708, a list of data definition language commands may be agreed upon by the computing devices of the transactional database and the compute nodes of the analytical database during performance of the handshake protocol. In some embodiments, block 708 may resemble at least negotiations 624 and 642. In block 710, additional information may be determined during the performance of the handshake protocol such that additional parameters and/or functionalities for maintaining representations of transactional tables at the analytical database may be defined. In some embodiments, block 710 may pertain to any additional negotiations of negotiations 622-654 that have not already been determined. Block 710 may additionally refer to any negotiations that will promote a "loose coupling" of the transactional database and the analytical database after the completion of the handshake protocol and autonomous/automatic functionalities pertaining to maintaining representations of transactional tables at the analytical database.

In block 712, the determined results of at least blocks 704-710 may be stored in a data store that is made accessible to the transactional database and the analytical database. In some embodiments, the data store of block 712 may resemble data store 658, which stores handshake results 660.

Figure 8:
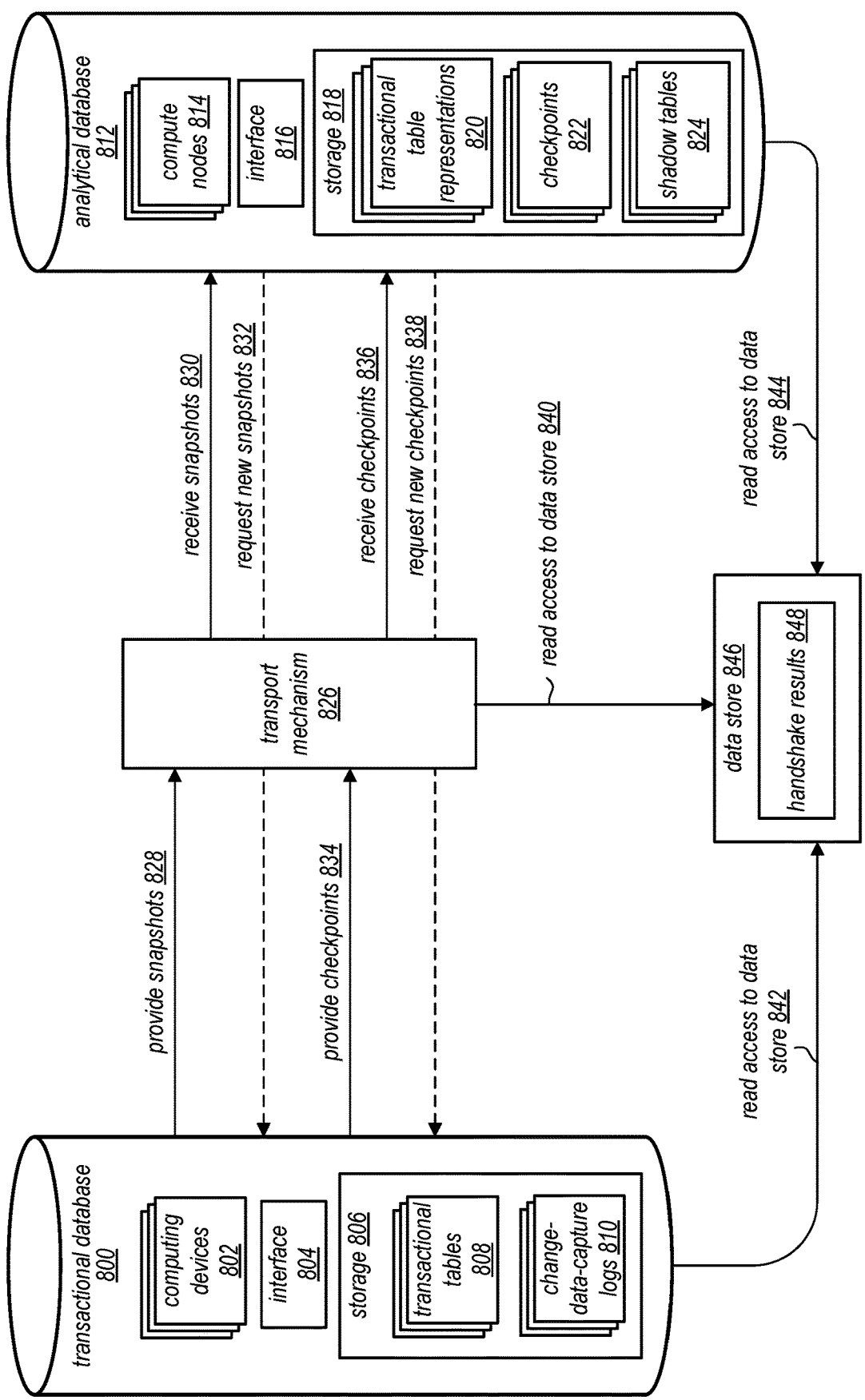
FIG. 8 illustrates the use of a transport mechanism to provide snapshots and checkpoints from a transactional database to an analytical database, according to some embodiments.

FIG. 8 illustrates the use of a transport mechanism to provide snapshots and checkpoints from a transactional database to an analytical database, according to some embodiments.

In some embodiments, transactional database 800, computing devices 802, interface 804, storage 806, transactional tables 808, and change-data-capture logs 810 may resemble transactional database 600, computing devices 602, and interface 604 and their functionalities described herein. Similarly, analytical database 812, compute nodes 814, and interface 816 may resemble analytical database 612, compute nodes 614, and interface 616 and their functionalities described herein. In some embodiments, FIG. 8 may describe embodiments in which one or more snapshots corresponding to transactional tables 808 have been provided to analytical database 812, and maintenance of the respective representations at analytical database 812 has already begun (e.g., via the methods and techniques described by at least block 500). As shown in FIG. 8, portions of transactional tables 808 may be provided to analytical database 812 via provide snapshots 828, transport mechanism 826, and receive snapshots 830. The portions of transactional tables 808 may then be stored in transactional table representations 820 within storage 818, according to some embodiments.

In order to maintain transactional table representations 820, checkpoints containing transactional changes of change-data-capture logs 810 may be provided to analytical database 812 via provide checkpoints 834, transport mechanism 826, and receive checkpoints 836, according to some embodiments. The checkpoints may then be stored in checkpoints 822 within storage 818, according to some embodiments. In addition, storage 818 may be used to maintain shadow tables 824, in which delete events of the transactional changes of checkpoints 822 may be buffered and committed to before being later committed to transactional table representations 820 (see description of at least FIGS. 10-13D herein).

In some embodiments, snapshots and checkpoints may be provided to analytical database 812 via one or more transport mechanisms 826 that have been determined during performance of handshake protocol 620. As shown in FIG. 8, transactional database 800 and analytical database 812 may have read access to data store 846 (e.g., via read access 842 and 844, respectively) in order to read handshake results 848. In a first example in which transport mechanism 826 is implemented using data storage service 120, snapshots and/or checkpoints may be provided to transport mechanism 826 via provide snapshots 828 and provide checkpoints 834 and stored in data stores of data storage service 120. In some embodiments, analytical database 812 may be provided access to said data stores of data storage service 120 such that the snapshots and checkpoints may be received to analytical database 812 via receive snapshots 830 and receive checkpoints 836. In a second example in which transport mechanism 826 is implemented using data streaming service 130, snapshots and/or checkpoints may be streamed to analytical database 812.

In some embodiments, transport mechanism 826 may resemble a "push" or "pull" mechanism. For example, transport mechanism 826 may be implemented by transactional database service 110, and computing devices 802 may be configured to "push" snapshots and checkpoints to analytical database 812 via a direct connection. Alternatively, transport mechanism 826 may be implemented by analytical database service 150, and compute nodes 814 may be configured to "pull" snapshots and checkpoints to analytical database 812 from transactional database 800 via a direction connection. In some embodiments, transport mechanism 826 may also be configured to have read access to data store 840, such that client account information, mapping, topology, and/or other relevant information pertaining to the transport of snapshots and checkpoints may be viewed by transport mechanism 826.

Figure 9A:
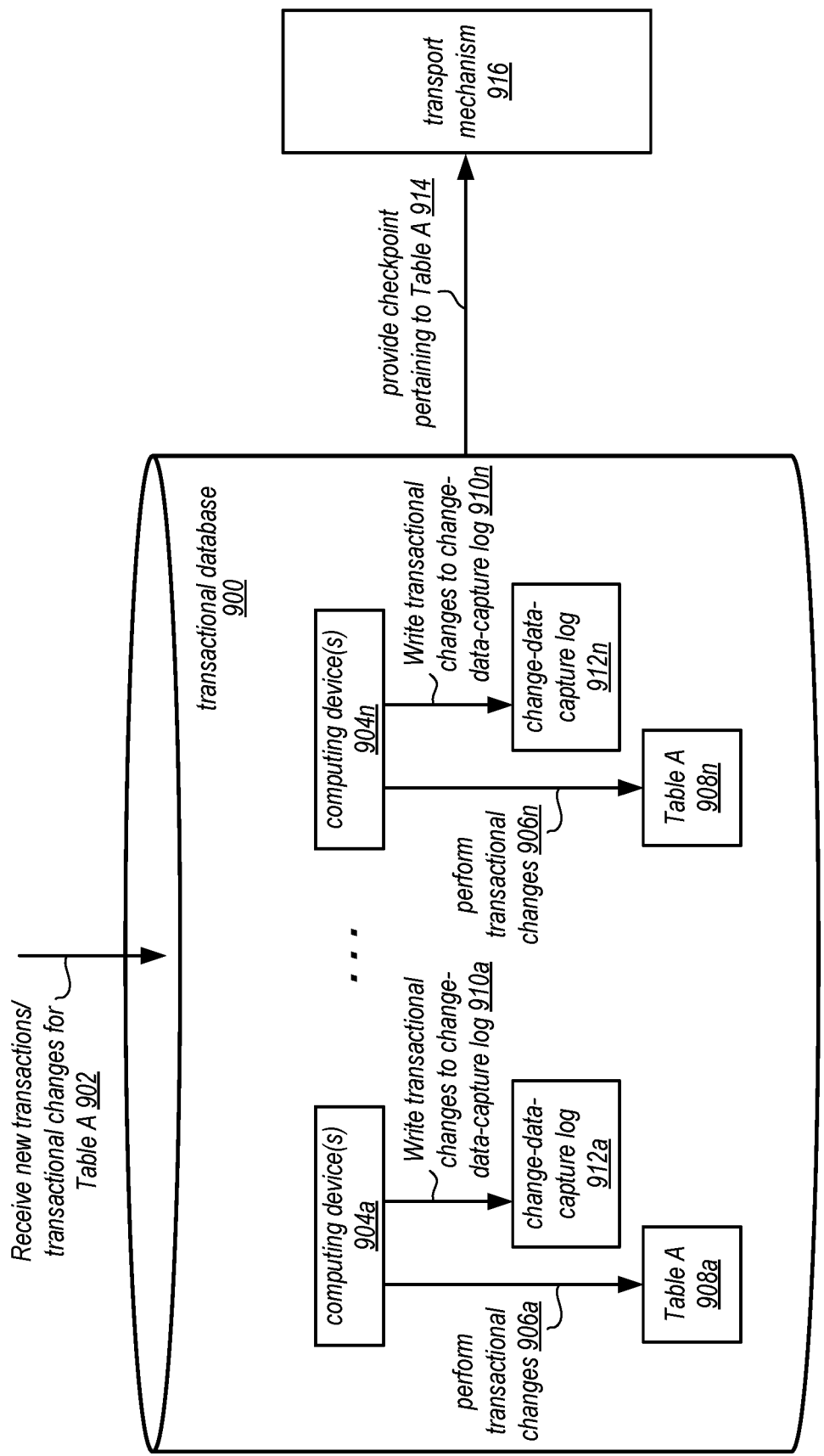
FIG. 9A illustrates a process of treating, at a transactional database, transactional changes to a transactional table and providing said transactional changes in a checkpoint to a transport mechanism for replication at a representation of the transactional table at an analytical database, according to some embodiments.

FIG. 9A illustrates a process of treating, at a transactional database, transactional changes to a transactional table and providing said transactional changes in a checkpoint to a transport mechanism for replication at a representation of the transactional table at an analytical database, according to some embodiments.

In some embodiments, transactional database 900 may be configured to maintain transactional tables, such as Table A, for a client of transactional database service 110. Transactional database 900 may resemble the configurations and have the functionalities described in at least FIGS. 2 and 3 for transactional database 200 and transactional database 300, according to some embodiments. In addition, computing device(s) 904 may resemble computing devices 602 and/or computing devices 802, and their functionalities described for said computing devices herein. A person having ordinary skill in the art should understand that FIG. 9A is meant for illustrative purposes, and that transactional database 900 may store additional transactional tables in addition to table A. Transactional database 900 may also include additional computing device(s) besides computing device(s) 904, and/or computing device(s) 904 may be configured to maintain additional transactional tables in addition to table A.

In some embodiments, transactional database 900 may receive new transactions/transactional changes for table A 902. New transactions may include one or more additional rows of data items that may be inserted to Table A, and transactional changes may include one or more changes to Table A (e.g., the deletion of a row of data items, an update to a row of data items, etc.). Computing device(s) 904 may then perform transactional changes 906 to Table A 908, wherein portions of Table A may be distributed across multiple storage system server nodes of distributed storage system 310, according to some embodiments. In addition, for each transactional change 906 that is applied to Table A 908, the transactional changes are written to change-data-capture log 912 via write transactional changes to change-data-capture log 910. At a given point during the maintenance of Table A, a checkpoint containing a portion of change-data-capture log 912 may be provided, via provide checkpoint pertaining to Table A 914, to transport mechanism 916. In some embodiments, the checkpoint is provided to transport mechanism 916 via the methods and techniques described herein with regard to at least FIG. 8. In addition, the frequency of checkpoints that are provided, the transport mechanism that is used to provide the checkpoints, and additional configurations of the checkpoints may be determined via the methods and techniques described herein with regard to at least FIGS. 6 and 7, and to the results of the handshake protocol.

Figure 9B:
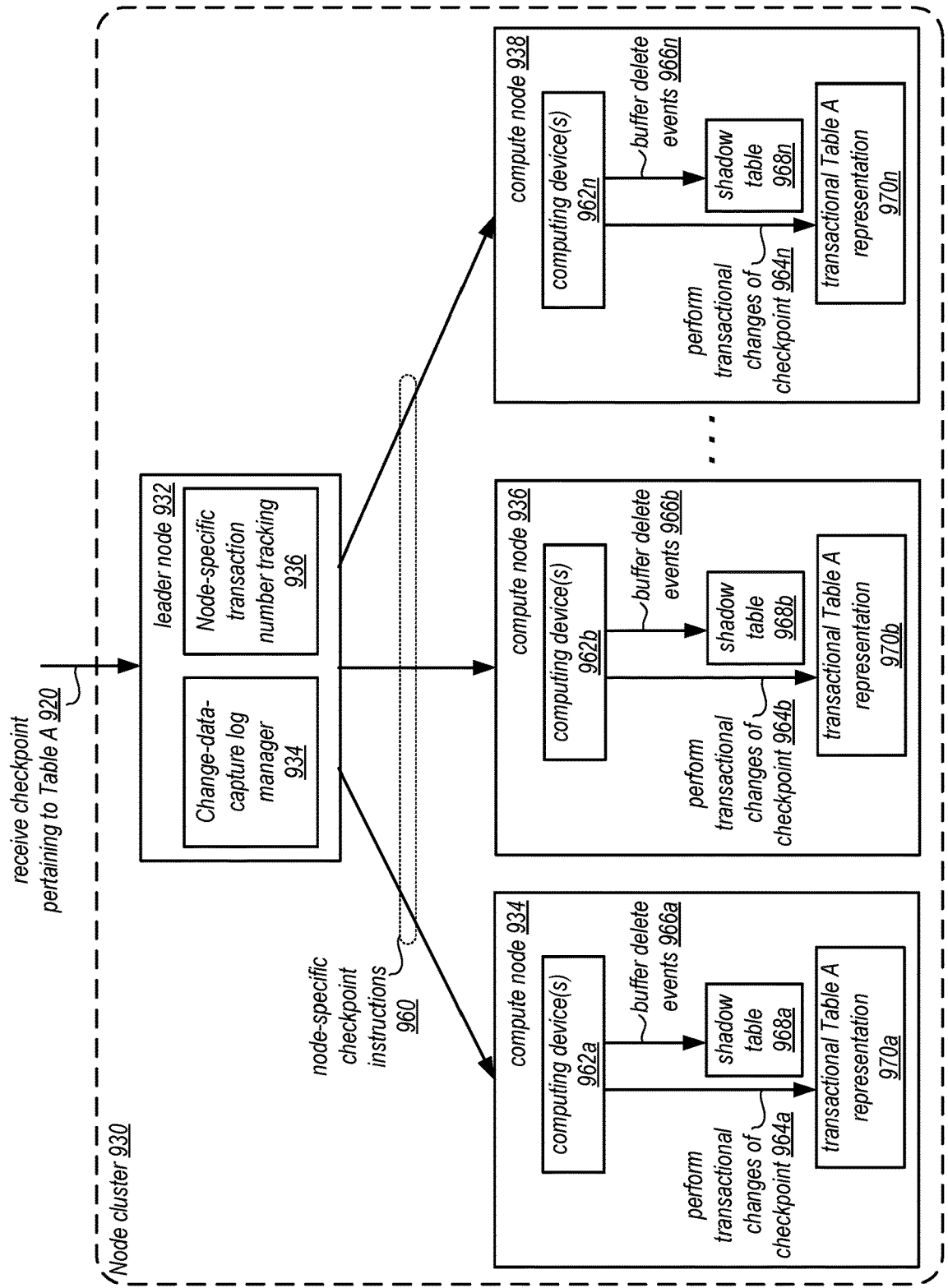
FIG. 9B illustrates a process of receiving, at an analytical database, a checkpoint of transactional changes that are then implemented to a representation of a transactional table maintained at the analytical database, according to some embodiments.

FIG. 9B illustrates a process of receiving, at an analytical database, a checkpoint of transactional changes that are then implemented to a representation of a transactional table maintained at the analytical database, according to some embodiments.

In some embodiments, the checkpoint pertaining to Table A 914 that was provided to transport mechanism 916 from transactional database 900 may be received (e.g., receive checkpoint pertaining to Table A 920) by leader node 932 of node cluster 930 of an analytical database. Node cluster 930 may resemble node cluster 430 and the functionalities of node cluster 430 described herein (e.g., query processing and execution). In addition, node cluster 930 may be a node cluster of analytical database system 400 within analytical database service 150, according to some embodiments.

Leader node 932 may partition checkpoint pertaining to Table A 920 according to the slices of the representation of Table A that are stored at respective compute nodes (e.g., compute nodes 934-938) of node cluster 930 using change-data-capture log manager 934. Leader node 932 may then provide node-specific checkpoint instructions 960 to respective compute nodes (e.g., compute nodes 934-938) such that the transactional changes of the checkpoint may be applied to the representation of Table A being maintained at node cluster 930. In other embodiments, incoming the transactional changes of checkpoint 920 may already be partitioned by compute node, and leader node 932 provides the node-specific checkpoint instructions 960.

Once node-specific checkpoint instructions 960 have been received at the respective compute nodes of node cluster 930, computing device(s) 962 may perform transactional changes of the checkpoint 964 to transactional Table A representation 970, according to some embodiments. Perform transactional changes of checkpoint 964 may include the processes described in at least block 1006, such as applying and committing "insert" events to the representation of Table A. In some embodiments, node-specific checkpoint instructions 960 may include "delete" events, which may be buffered and committed to shadow table 968 via buffer delete events 966. Buffered delete events in shadow table 968 may later be applied and committed to transactional Table A representation 970 as a background operation of node cluster 930 (see description for FIGS. 11A-13D herein). Such processes of receiving checkpoints and performing the transactional changes to a representation of a given transactional table may be repeated via the methods and techniques described herein (e.g., processes described in block 500).

Leader node 932 may also be configured to maintain node-specific transaction number tracking 936, according to some embodiments. In order to understand a possible lag between the maximum transaction number applied to a given transactional table at the transactional database and the maximum transaction number applied to the corresponding representation of the transactional table at the analytical database, node-specific transaction number tracking 936 may include information about the maximum transaction number that has been committed at respective compute nodes of node cluster 930. Maintaining such information at leader node 932 may allow leader node 932 to organize node-specific checkpoint instructions 960 that correspond to the transactional changes at respective compute nodes that still need to be applied to transactional Table A representation 970. In some embodiments, based on information stored in node-specific transaction number tracking 936, leader node 932 may request an additional checkpoint (e.g., poll the transactional database via request new checkpoints 838) upon confirming that one or more compute nodes of the node cluster has committed all transactional changes in the current given checkpoint. In addition, in some embodiments in which node cluster 930 temporarily goes offline and/or an error in performing transactional changes to Table A representation occurs, leader node 932 may use information stored in node-specific transaction number tracking 936 to determine the transactional number that one or more of the compute nodes of node cluster 930 should be reset to (e.g., the respective maximum committed transaction numbers of the corresponding compute nodes).

FIG. 10 is a flow diagram illustrating a process of implementing transactional changes to a representation of a transactional table in which delete events are first buffered and committed to a shadow table before being applied and committed as a batch to the representation, according to some embodiments.

In some embodiments, the implementation of the transactional changes that are received by the analytical database and used to both update the representation and keep it maintained as a replication of a transactional table that is stored in the transactional database may include the steps shown in FIG. 10. In addition, block 510, shown in FIG. 5, may resemble the process shown in blocks 1006, 1008, 1010, and 1012, according to some embodiments.

In block 1000, a representation of at least some portions of a transactional table, stored at a transactional database, is maintained at an analytical database. In some embodiments, the process for maintaining the representation may include the processes described in blocks 1002, 1004, 1006, 1008, 1010, and 1012, and may also include methods and techniques described in at least blocks 500-510 of FIG. 5. In some embodiments, the transactional database described in block 1000 may resemble transactional database system 200 of transactional database service 110, and the analytical database may resemble analytical database system 400 of analytical database service 150, including the functionalities of said components described herein. Furthermore, FIGS. 11A-13D provide example embodiments of the maintenance of a representation of a given transactional Table A at an analytical database.

In block 1002, segments of the portion(s) of the transactional table are received as snapshots to the analytical database. As described above, such snapshots may be stored in one or more compute nodes of a node cluster at the analytical database, such as compute nodes 934-938 of node cluster 930, according to some embodiments. Continuing with the example embodiments shown in FIGS. 11A-13D, block 1002 may refer to a snapshot of Table A, which is being maintained as a representation at the analytical database. In block 1004, checkpoints that correspond to the snapshots described in block 1002 are also received at the analytical database. In some embodiments in which the snapshot of block 1002 refers to Table A, the checkpoints of block 1004 may resemble transactional changes that are to be applied to the representation of Table A in order to maintain the replication of Table A at the analytical database (e.g., checkpoint 1140).

In block 1006, the transactional changes of the checkpoints of block 1004 are implemented in transactional order to the representation of the portion(s) of the table. Continuing with the example embodiments shown in FIGS. 11A-13D, block 1006 (and blocks 1008, 1010, and 1012) may refer to the implementation of at least transactional changes contained in checkpoint 1140 (e.g., transactions 1150-1180) to Table A representation 1100, according to some embodiments. Block 1008 may include the process of applying and committing "insert" events (see the description of transactional changes within checkpoint 1140 below), while blocks 1010 and 1012 may include the process of buffering and committing "delete" events to a shadow table, and then later applying and committing them to the representation of Table A (see at least the description of shadow table 1230 and FIGS. 13A-13D below). As shown by blocks 1008, 1010, and 1012, insert operations of the transactional changes within the given checkpoint described by block 1006 may be applied and committed to the transactional table representation without being buffered or committed to a shadow table, while delete operations may be buffered to a shadow table for implementation to the representation of Table A at a later point. The buffered delete operations may be applied to the representation of Table A in transactional order as a "lazy" operation (e.g., at moments in which there is available processing power, and/or once a threshold limit of the shadow table has been reached), and then committed as a batch.

FIGS. 11A-D illustrate the state of a table representation maintained at an analytical database and a corresponding shadow table, checkpoint, and table as viewed by an external client of the analytical database just prior to the implementation of a given transaction number 1180, according to some embodiments.

FIG. 11A provides an illustrative example of a given transactional table, Table A, that is stored at the transactional database and whose representation (e.g., a replication of Table A) is being maintained at the analytical database via the methods and techniques described herein. Table A representation 1100 is meant to be a conceptual example for illustrative purposes. A person having ordinary skill in the art should understand that table A representation 1100 in FIG. 11A may represent a visual reconstruction of the portions of the Table A representation that may be stored across multiple compute nodes of a given node cluster at the analytical database. For example, portions (e.g., slices, shards, etc.) of Table A representation 1100 may be maintained across compute nodes 934-938, and stored in transactional table A representation 970 and/or cold storage tier 406, according to some embodiments. Furthermore, Table A contains three columns in FIG. 11A (column 1102, column 1104, and column 1106), but a person having ordinary skill in the art should also understand that Table A and/or other table representations maintained at the analytical database may contain more or less columns than in the example given in FIG. 11A and still utilize the methods and techniques described herein. In addition, one or more columns may be added or removed from Table A representation 1100 during the process of maintaining Table A representation 1100 at the analytical database. Table A representation 1100 may also have columns that are for internal use by the analytical database, namely inserts tracking 1108 and deletes tracking 1110, according to some embodiments. Inserts tracking 1108 and deletes tracking 1110 columns will be further detailed in the following paragraphs.

In some embodiments, Table A representation 1100 may contain data items that may be organized in a columnar, tabular format. At the moment in time illustrated by FIGS. 11A-D (e.g., after the application of transaction number 1170 but before beginning the application of transaction number 1180), Table A representation 1100 may contain four rows, each comprising three data items. For example, row 1112 contains a string 'Alpha' in column 1102, an integer '1' in column 1104, and another string 'Value_1' in column 1106. Similarly, row 1114 contains string 'Alpha' in column 1102, integer '2' in column 1104, and string 'Value_1' in column 1106; row 1116 contains string 'Beta' in column 1102, integer '1' in column 1104, and string 'Value_1' in column 1106; and row 1118 contains string 'Beta' in column 1102, integer '2' in column 1104, and string 'Value_1' in column 1106. As a shorthand for the description herein, the data items in a given row, such as row 1112, may be referred to as 'Alpha|1|Value_1.' Again, Table A representation 1100 is meant for illustrative purposes, and additional columns containing other data types (e.g., floats, characters, Boolean variables, etc.) may also be incorporated into other embodiments of the examples described herein.

In some embodiments, Table A representation 1100 may also contain columns for internal use, such as inserts tracking 1108 and deletes tracking 1110, that may track the transaction number that a given row was added to and/or deleted from the table. For example, as shown in FIG. 11A, row 1112 has been added during the implementation of transaction number 1150, and then deleted during transaction number 1160. In another example, row 1114 has been added during transaction number 1155, and, at the moment in time depicted by FIG. 11A (e.g., after the application of transaction 1170 but before beginning the application of transaction 1180), row 1114 has not been deleted. "Hidden" columns, such as inserts tracking 1108 and deletes tracking 1110, may serve at least several purposes: Firstly, such transaction number tracking allows the analytical database to return query results based on transaction number. For example, an incoming query may request data items pertaining to the state of Table A representation at transaction number 1175. At transaction number 1175, the representation of Table A may resemble transaction 1175 Table A view 1142, if viewed by a client of the analytical database service, as shown in FIG. 11D, in which rows 1114 and 1118 are visible. The incoming query may return results containing data items from rows 1114 and 1118, but not rows 1112 or 1116, as, from the perspective of Table A at transaction number 1175, rows 1112 and 1116 have already been deleted from Table A. Secondly, the hidden columns may also serve as a record in the event that Table A representation needs to revert back to the state it was at during a previously committed transaction. For example, if transactional changes for Table A representation 1100 have been both applied and committed up through transaction number 1160, but transaction numbers 1165 and 1170 have been applied but not yet committed, in the event that the analytical database goes temporarily offline at this moment (e.g., due to a temporary network malfunction, power outage affecting servers of the analytical database, etc.), Table A representation 1100 will be reverted back to the state it was at just after the last transaction commit (e.g., transaction number 1160 in the given example).

In some embodiments, examples of transactional changes of a given checkpoint (e.g., checkpoint 1140) that may be implemented to Table A representation 1100 are shown in FIG. 11C. Transactional changes may include "insert," "delete," and "update" events (e.g., operations), which are further explained in the following paragraphs.

In a first example of "insert" events, transaction 1150 contains the instructions to insert (e.g., append, add, etc.) a new row to Table A representation 1100, wherein the new row contains the following data items for column 1102, column 1104, and column 1106, respectively: 'Alpha,' '1,' and 'Value_1.' As shown in row 1112 of Table A representation 1100, data items 'Alpha,' '1,' and 'Value_1' are entered into Table A representation 1100, and transaction number 1150 is recorded in the inserts tracking 1108 column for row 1112 as the transaction number during which row 1112 was inserted. After committing (or at least applying) the transactional changes contained in transaction 1150, the compute nodes of the node cluster at the analytical database will advance to the instructions of the next transaction number contained in checkpoint 1140 (e.g., transaction 1155 in this example). Similarly, transaction 1155 contains the instructions to insert row 1114 into Table A representation 1100 using data items 'Alpha,' '2,' and 'Value_1,' and transaction number 1155 is recorded in the inserts tracking 1108 column for row 1114 as the transaction number during which row 1114 was inserted.

In a second example containing an "update" event, transaction 1160 contains the instructions to update an already-existing row of Table A representation 1100. In some embodiments, an "update" event may contain at least one "insert" operation and one "delete" operation. In addition, transaction 1160 uses a primary key to inform the compute nodes of the node cluster which row the update event pertains to. As shown in FIG. 11C, the instructions for transaction 1160 pertain to the row with a primary key of '{Alpha,1},' which the compute nodes of the node cluster then understand to mean row 1112, according to some embodiments. The instructions for the given update event then instruct the compute nodes of the node cluster to replace 'Alpha' in column 1102 of row 1112 with 'Beta.' In some embodiments, this update event may then comprise two steps: (1) deletion of row 1112 containing data items 'Alpha|1|Value_1' from Table A representation 1100, and (2)

insertion of row 1116 containing data items 'Beta|1|Value_1' into Table A representation 1100. As shown in Table A representation 1100, a record of the deletion of row 1112 is recorded into the deletes tracking 1110 column of row 1112, and a record of the insertion of row 1116 is recorded into the inserts tracking 1108 column of row 1116, according to some embodiments. A person having ordinary skill in the art should understand that, according to different embodiments of the implementation of the given update event, the compute nodes of the node cluster may first delete row 1112 and then add row 1116, or first add row 1116 and then delete row 1112, as both embodiments still result in the application of the update event. Furthermore, the instructions for the deletion of row 1112 may instead be buffered and committed to shadow table 1130 (e.g., with primary key {Alpha,1}' being stored in the primary key 1132 column and transaction number 1160 being stored in the buffered deletes tracking 1134 column), which is discussed below with regard to FIGS. 12A-12D.

In some embodiments, checkpoint 1140 may then contain instructions in transaction 1165 to insert a new row to Table A representation 1100 containing data items 'Beta|2|Value_1,' which is shown in Table A representation 1100 as row 1118. Similarly, a record of the insertion of row 1118 into Table A representation 1100 is recorded in the inserts tracking 1108 column of row 1118 as being inserted during the implementation of transaction number 1165. Following the committing (or at least application) of the transactional changes contained in transaction 1165, checkpoint 1140 may then contain instructions in transaction 1170 to delete the row of Table A representation 1100 with the primary key {Beta,1}.' As shown in Table A representation 1100, row 1116, which has data items 'Beta' in column 1102 and '1' in column 1104, is deleted from Table A representation 1100, as recorded in the deletes tracking 1100 column of row 1116. In some embodiments, after the implementation of transactional changes with lower transaction numbers than transaction 1180, the compute nodes of the node cluster may move on to the implementation of the transactional changes in transaction 1180. Transaction 1180 is discussed below in further detail with regard to FIGS. 12A-D.

Checkpoint 1140 is meant to be an illustrative example of a checkpoint that contains a portion of the transactional changes of the change-data-capture log received from the transactional database via the methods and techniques described herein, and a person having ordinary skill in the art should understand that checkpoints such as checkpoint 1140 may be written in other forms (e.g., structured query language (SQL)) as long as the data definition language (DDL) commands of the given checkpoint may be interpreted by the analytical database. Furthermore, checkpoint 1140 may be received to compute nodes 934-938 via node-specific checkpoint instructions 960, according to some embodiments. In addition, for illustrative purposes, transactions 1150, 1155, 1160, 1165, and 1170 have been crossed out in FIG. 11C to represent the concept that transactions 1150, 1155, 1160, 1165, and 1170 have already been applied (and, in some embodiments, committed) to Table A representation 1100. The arrow pointing to transaction 1180 in FIG. 11C similarly represents the next transaction number that the compute nodes of the node cluster are going to apply to Table A representation 1100 at the moment in time depicted by FIGS. 11A-11D.

FIGS. 12A-D illustrate the state of the table representation, shadow table, checkpoint, and table view of FIGS. 11A-D just after the implementation of transaction number 1180, according to some embodiments.

Continuing with the example embodiments shown in FIGS. 11A-D, FIGS. 12A-D demonstrate the effects of the implementation of transaction number 1180 to Table A representation 1100 and shadow table 1130, in which Table A representation 1100 and shadow table 1130 may represent the states of Table A representation and the corresponding shadow table just prior to the implementation of transaction number 1180, and Table A representation 1200 and shadow table 1230 may represent the states of Table A representation and the corresponding shadow table just after the implementation of transaction number 1180, according to some embodiments. In some embodiments, transaction number 1180 may include an "update" event that applies to all non-deleted rows of Table A representation 1200 (e.g., at the moment of time that transaction 1180 is being applied to the Table A representation). As discussed above with regard to FIGS. 11A-D, the update event of transaction number 1180 may include respective insert and delete operations for each of the respective rows that the update event pertains to. For example, the non-deleted rows of Table A representation 1200 at the moment in time just prior to the implementation of the instructions for transaction number 1180 may be rows 1114 and 1118, according to some embodiments. Therefore, individual insert and delete operations pertaining to rows 1114 and 1118, respectively, may be applied to Table A representation as part of implementing the transactional changes of transaction number 1180, according to some embodiments. As shown in Table A representation 1200, rows 1220 and 1222 are inserted into Table A representation 1200 in order to apply the respective insert operations of transaction number 1180 in which the data items in column 1106 of rows 1114 and 1118 have both been respectively changed from 'Value 1' to 'Value 2' in column 1106 of rows 1220 and 1222. In some embodiments, an additional "hidden" column of Table A representation 1200 may be used to track operations of a given transaction. For example, in embodiments in which row 1220 is inserted into Table A representation 1200 before row 1222, both as part of the implementation of transaction number 1180, row 1220 may be listed as operation 1 of transaction 1180 (e.g., 1180.1) and row 1222 may be listed as operation 2 of transaction 1180 (e.g., 1180.2) in "hidden" column operations tracking. A tracking of operations within a given transaction number may also be referred to as assigning Statement IDs to the operations of a given transaction number, according to some embodiments.

In some embodiments, as part of implementing the transactional changes of transaction number 1180, the delete operations (e.g., the deletions of rows 1114 and 1118) may be buffered and committed to shadow table 1230, as shown in FIG. 12B, via the methods and techniques described herein with regard to at least FIG. 9B and FIG. 10. As shown in shadow table 1230, rows 1236 and 1238 respectively represent row 1114 and 1118 of Table A representation 1200, wherein primary keys '{Alpha,2}' and '{Beta,2}' are respectively stored in primary key 1132 column of rows 1236 and 1238, and transaction number 1180 is recorded in buffered deletes tracking 1134 as the transaction number at which rows 1114 and 1118 were deleted from Table A representation 1200. As discussed with regard to block 1012 of FIG. 10, rows 1236 and 1238 may remain in shadow table 1230 for a given amount of time before being applied and committed to Table A representation 1200. The "batch" commit of rows 1236 and 1238 of shadow table 1230 to Table A representation 1200 is discussed below with regard to FIGS. 13A-D. In addition, rows 1112 and 1116 of Table A representation 1200 remain unchanged between the embodiments shown in FIG. 11A and the embodiments shown in FIG. 12A, as the instructions contained in transaction number 1180 do not apply to row 1112 or row 1116.

As discussed above with regard to Table A representation 1100, shadow table 1230 is meant to be a conceptual example for illustrative purposes. A person having ordinary skill in the art should understand that shadow table 1230 may represent a visual reconstruction of portions of the shadow table that may be stored across multiple compute nodes of a given node cluster at the analytical database. For example, portions of shadow table 1230 may be maintained across compute nodes 934-938, and stored in shadow table 968, according to some embodiments.

As shown in FIG. 12C, following the insertion of rows 1220 and 1222 to Table A representation 1200 and the buffering and committing of rows 1236 and 1238 in shadow table 1230, the instructions contained in transaction number 1180 may be considered to be complete, and the compute nodes of the node cluster may move on to a transaction number that follows transaction number 1180 (as indicated by the arrow on checkpoint 1140). In some embodiments, this may be transaction number 1181. In other embodiments, transaction number 1180 may be the final transaction number in node-specific checkpoint instructions 960, at which point leader node 932 may provide additional node-specific checkpoint instructions to compute nodes 934-938, and/or poll the analytical database for additional transactional changes to apply to Table A representation.

In some embodiments, FIG. 12D may represent Table A representation 1200 if viewed by a client of the analytical database service just after the implementation of transaction number 1180. For example, transaction 1181 Table A view 1242 may include two rows which correspond to rows 1220 and 1222 of Table A representation. In some embodiments, rows that have been indicated as deleted from Table A representation 1200 on or before transaction number 1180 via deletes tracking 1110 column (e.g., row 1112 and row 1114) may not be included in transaction 1181 Table A view 1242. In addition, rows that have been marked for future deletion from Table A representation 1200 may be buffered to shadow table 1230 (e.g., row 1236 and row 1238), and therefore may also not be included in transaction 1181 Table A view 1242, according to some embodiments. To further emphasize this point, this may mean that even though rows 1114 and 1118 may not have been recorded as being deleted at transaction number 1180 in the deletes tracking 1110 column of Table A representation 1200, if they have been buffered and committed to shadow table 1230 (e.g., as shown by rows 1236 and 1238), then they may be treated as deleted rows of Table A representation 1200 from the perspective of a client of the analytical database service. Furthermore, if an incoming query were to request results of Table A representation 1200 based on the state of Table A representation just after the completion of instructions contained in transaction number 1180, results of rows 1112, 1114, 1116, and 1118 may not be included in the results of the query, based on the state of Table A representation 1200 and shadow table 1230.

FIGS. 13A-D illustrate the state of the table representation, shadow table, checkpoint, and table view of FIGS. 11A-D at a point after the implementation of transaction number 1180, according to some embodiments.

In some embodiments, the "batch" commit of rows 1236 and 1238 of shadow table 1230 to Table A representation 1300 may resemble embodiments shown in FIGS. 13A-D. Following the embodiments shown in FIGS. 12A-D in which the respective insert operations of transaction number 1180 have been inserted into Table A representation 1200 and the respective delete operations of transaction number 1180 have been buffered and committed to shadow table 1230, FIGS. 13A-D illustrate a later point in time in which rows 1236 and 1238 of shadow table 1230 are applied and committed to Table A representation 1300. As discussed with regard to FIG. 10, delete operations that have been buffered and committed to the shadow table throughout the process of implementing transactional changes of given checkpoint(s) (e.g., checkpoint 1140 as shown in FIG. 13C) to the representation of Table A may then be applied in transactional order to the representation of Table A and committed as a batch. In some embodiments, buffered delete events of shadow table 1330 may be applied to representation of Table A 1300 as a "lazy," background operation, in which the application of delete events to Table A representation 1300 are delayed and subsequently applied as a background operation (e.g., when computing/processing power may be available for such delete operation applications). In other embodiments, delete events will continue to be buffered and committed to the shadow table until the shadow table reaches a given threshold capacity, at which point a "batch" application of delete events to Table A representation is triggered. A person having ordinary skill in the art should understand that different combinations of such reasons for first buffering delete events to a shadow table and subsequently committing them to Table A representation may also be included in such embodiments. For example, if the shadow table has not yet reached the given threshold capacity, but processing power is available to apply the delete events to Table A representation 1300, the delete events may still be applied using the available processing power. After the buffered delete events have been applied to Table A representation 1300, they are committed as a batch and removed from shadow table 1330, as described in the following paragraphs.

As shown in Table A representation 1300, rows 1112, 1116, 1220, and 1222 remain unchanged between the embodiments shown in FIG. 12A and the embodiments shown in FIG. 13A, as applying and committing rows 1236 and 1238 of shadow table 1230 to Table A representation 1300 does not concern rows 1112, 1116, 1220, and 1222. However, the application of rows 1236 and 1238 of shadow table 1230 to Table A representation 1300 may involve recording transaction number 1180 into the deletes tracking 1110 column of rows 1314 and 1318.

In some embodiments, the application of a given buffered delete event of the shadow table to Table A representation may include three steps: (1) using the primary key in the primary key 1132 column, scan (or parse, search, etc.) the representation of Table A for the row at which to apply the delete event, (2) apply (or write, etc.) the delete event to the given row of Table A representation, and (3) commit the delete event. This process may be repeated, in transactional order, for a number of buffered delete events of the shadow table. For example, row 1236 of shadow table 1230 contains information that a delete event at transaction number 1180 has been buffered and committed to shadow table 1230, and pertains to a row of Table A representation 1300 that has a primary key of '{Alpha, 2}.' Upon scanning Table A representation 1300 for a row with a primary key of '{Alpha, 2}' and confirming that primary key '{Alpha,2}' corresponds to row 1314, transaction number 1180 is recorded into the deletes tracking 1110 column of row 1314. In some embodiments, the process may repeat for row 1238 of shadow table 1230 in which primary key '{Beta,2}' is used to record transaction number 1180 into the deletes tracking 1110 column of row 1318. These transactional changes to rows 1314 and 1318 of Table A representation 1300 may then be committed as a batch. Upon committing said transactional changes, leader node 932 may update node-specific transaction number tracking 936 to having committed transaction number 1180 for the compute nodes pertaining to the embodiments shown in Table A representation 1300, according to some embodiments.

In some embodiments, FIG. 13D may represent Table A representation as viewed from a client of the analytical database service just after the commit of transaction number 1180. It may be noted that transaction 1181 Table A view 1342, as shown in FIG. 13D, remains unchanged from transaction 1181 Table A view 1232, as shown in FIG. 12D, since, from the perspective of a client of the analytical database service, rows 1314 and 1318 were either marked as a buffered delete event of the shadow table (e.g., FIG. 12B) or committed delete events of the representation of Table A (e.g., FIG. 13B).

Embodiments of the hybrid transactional and analytical processing methods and systems described herein may be executed on one or more computer systems, which may interact with various other devices. One such computer system is illustrated by FIG. 14. FIG. 14 is a block diagram illustrating a computer system that may implement at least a portion of the systems described herein, according to various embodiments. For example, computer system 1400 may implement a database engine head node of a database tier, or one of a plurality of storage nodes of a separate distributed storage system that stores databases and associated metadata on behalf of clients of the database tier, in different embodiments. Computer system 1400 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1400 includes one or more processors 1410 (any of which may include multiple cores, which may be single or multi-threaded) coupled to a system memory 1420 via an input/output (I/O) interface 1430. Computer system 1400 further includes a network interface 1440 coupled to I/O interface 1430. In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. The computer system 1400 also includes one or more network communication devices (e.g., network interface 1440) for communicating with other systems and/or components over a communications network (e.g. Internet, LAN, etc.). For example, a client application executing on system 1400 may use network interface 1440 to communicate with a server application executing on a single server or on a cluster of servers that implement one or more of the components of the database systems described herein. In another example, an instance of a server application executing on computer system 1400 may use network interface 1440 to communicate with other instances of the server application (or another server application) that may be implemented on other computer systems (e.g., computer systems 1490).

In the illustrated embodiment, computer system 1400 also includes one or more persistent storage devices 1460 and/or one or more I/O devices 1480. In various embodiments, persistent storage devices 1460 may correspond to disk drives, tape drives, solid state memory, other mass storage devices, or any other persistent storage device. Computer system 1400 (or a distributed application or operating system operating thereon) may store instructions and/or data in persistent storage devices 660, as desired, and may retrieve the stored instruction and/or data as needed. For example, in some embodiments, computer system 1400 may host a storage node, and persistent storage 1460 may include the SSDs attached to that server node.

Computer system 1400 includes one or more system memories 1420 that may store instructions and data accessible by processor(s) 1410. In various embodiments, system memories 1420 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1420 may contain program instructions 1425 that are executable by processor(s) 1410 to implement the methods and techniques described herein. In various embodiments, program instructions 1425 may be encoded in platform native binary, any interpreted language such as Java™ byte-code, or in any other language such as C/C++, Java™, etc., or in any combination thereof. For example, in the illustrated embodiment, program instructions 1425 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1425 may implement multiple separate clients, server nodes, and/or other components.

In some embodiments, program instructions 1425 may include instructions executable to implement an operating system (not shown), which may be any of various operating systems, such as UNIX, LINUX, Solaris™, MacOS™, Windows™, etc. Any or all of program instructions 1425 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1400 via I/O interface 1430. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1440.

In some embodiments, system memory 1420 may include data store 1445, which may be implemented as described herein. For example, the information described herein as being stored by the database tier (e.g., on a database engine head node), such as a transaction log, an undo log, cached page data, or other information used in performing the functions of the database tiers described herein may be stored in data store 1445 or in another portion of system memory 1420 on one or more nodes, in persistent storage 1460, and/or on one or more remote storage devices 1470, at different times and in various embodiments. Similarly, the information described herein as being stored by the storage tier (e.g., redo log records, coalesced data pages, and/or other information used in performing the functions of the distributed storage systems described herein) may be stored in data store 1445 or in another portion of system memory 1420 on one or more nodes, in persistent storage 1460, and/or on one or more remote storage devices 1470, at different times and in various embodiments. In general, system memory 1420 (e.g., data store 1445 within system memory 1420), persistent storage 1460, and/or remote storage 1470 may store data blocks, replicas of data blocks, metadata associated with data blocks and/or their state, database configuration information, and/or any other information usable in implementing the methods and techniques described herein.

In one embodiment, I/O interface 1430 may coordinate I/O traffic between processor 1410, system memory 1420 and any peripheral devices in the system, including through network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments, some or all of the functionality of I/O interface 1430, such as an interface to system memory 1420, may be incorporated directly into processor 1410.

Network interface 1440 may allow data to be exchanged between computer system 1400 and other devices attached to a network, such as other computer systems 1490 (which may implement one or more storage system server nodes, database engine head nodes, and/or clients of the database systems described herein), for example. In addition, network interface 1440 may allow communication between computer system 1400 and various I/O devices 1450 and/or remote storage 1470. Input/output devices 1450 may, in some embodiments, include one or more display terminals, keyboards, keypads, touchpads, scanning devices, voice or optical recognition devices, or any other devices suitable for entering or retrieving data by one or more computer systems 1400. Multiple input/output devices 1450 may be present in computer system 1400 or may be distributed on various nodes of a distributed system that includes computer system 1400. In some embodiments, similar input/output devices may be separate from computer system 1400 and may interact with one or more nodes of a distributed system that includes computer system 1400 through a wired or wireless connection, such as over network interface 1440. Network interface 1440 may commonly support one or more wireless networking protocols (e.g., Wi-Fi/IEEE 802.11, or another wireless networking standard). However, in various embodiments, network interface 1440 may support communication via any suitable wired or wireless general data networks, such as other types of Ethernet networks, for example. Additionally, network interface 1440 may support communication via telecommunications/telephony networks such as analog voice networks or digital fiber communications networks, via storage area networks such as Fibre Channel SANs, or via any other suitable type of network and/or protocol. In various embodiments, computer system 1400 may include more, fewer, or different components than those illustrated in FIG. 20 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGs. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more computing devices configured to implement a transactional database, wherein the one or more computing devices implementing the transactional database are configured to:
maintain a table comprising data items; and
write transactional changes made to the table to a change-data-capture log;
one or more compute nodes organized into a node cluster and configured to implement an analytical database, wherein the one or more compute nodes of the node cluster are configured to:
maintain a representation of at least one portion of the table, wherein to maintain comprises applying respective ones of the transactional changes of the change-data-capture log, received at the analytical database, to update the representation of the at least one portion of the table;
wherein the one or more computing devices implementing the transactional database and the compute nodes of the node cluster implementing the analytical database are further configured to perform a handshake protocol to:
determine a mapping for distributing respective portions of the transactional changes of the change-data-capture log to the one or more compute nodes of the node cluster, wherein:
the determine the mapping is based, at least in part, on a distribution of a plurality of snapshots, each snapshot comprising a segment of the at least one portion of the table, across the one or more compute nodes of the node cluster; and
the respective portions of the transactional changes comprise transactional changes organized into checkpoints, each corresponding to a respective one of the plurality of snapshots;
determine at least one transport mechanism to be used for providing the plurality of snapshots and checkpoints from the transactional database to the analytical database; and
determine one or more data definition language commands that are incompatible with the checkpoints; and
wherein the one or more computing devices implementing the transactional database and/or the compute nodes of the node cluster implementing the analytical database cause determined results of the handshake protocol to be stored in a data store accessible to the one or more computing devices implementing the transactional database and the one or more computing nodes of the node cluster implementing the analytical database.

2. The system of claim 1, wherein the at least one transport mechanism is further configured to:
receive the plurality of snapshots;
make the plurality of snapshots accessible to the analytical database;
receive the checkpoints; and
make the checkpoints accessible to the analytical database.

3. The system of claim 1, wherein:
the transactional database and the analytical database are part of a service provider network; and
a respective one of the determined at least one transport mechanism is a data storage service of the service provider network.

4. The system of claim 3, wherein the data store where the determined results of the handshake protocol are stored is in a storage of the data storage service.

5. The system of claim 1, wherein:
the transactional database and the analytical database are part of a service provider network; and
a respective one the determined at least one transport mechanism is a data streaming service of the service provider network.

6. The system of claim 1, wherein the handshake protocol is further configured to:
determine logic for generating respective primary keys for rows of the at least one portion of the table; and
store the determined logic in the data store with the determined results of the handshake protocol.

7. The system of claim 6, wherein the generated respective primary keys are:
respective row identifiers of the rows of the at least one portion of the table;
respective subsets of the data items within the rows of the at least one portion of the table; or
respective concatenations of all the data items within the rows of the at least one portion of the table.

8. A method, comprising:
initiating a handshake protocol for maintaining, at an analytical database, a representation of at least one portion of a table, stored at a transactional database, wherein:
one or more computing devices are configured to implement the transactional database;
one or more compute nodes organized into a node cluster are configured to implement the analytical database;
performing, by the one or more computing devices and the one or more compute nodes, the handshake protocol, wherein the performing the handshake protocol comprises:
determining a mapping for distributing respective portions of the transactional changes of the change-data-capture log to the one or more compute nodes of the node cluster, wherein:
the determining the mapping is based, at least in part, on a distribution of a plurality of snapshots, each snapshot comprising a segment of the at least one portion of the table, across the one or more compute nodes of the node cluster; and
the respective portions of the transactional changes comprise transactional changes organized into checkpoints, each corresponding to a respective one of the plurality of snapshots;
determining at least one transport mechanism to be used for providing the plurality of snapshots and checkpoints from the transactional database to the analytical database; and
determining one or more data definition language commands that are incompatible with the checkpoints; and
storing determined results of the handshake protocol in a data store accessible to the transactional database and the analytical database; and
wherein, responsive to the storing the determined results of the handshake protocol, the maintaining the representation of the at least one portion of the table comprises:

writing, at the transactional database, transactional changes made to the at least one portion of the table to the change-data-capture log; and committing, at the analytical database, respective ones of the transactional changes of the checkpoints to the representation.

9. The method of claim 8, wherein the performing the handshake protocol further comprises:

determining logic for generating respective primary keys for rows of the at least one portion of the table; and storing the determined logic in the data store with the determined results of the handshake protocol.

10. The method of claim 8, wherein the performing the handshake protocol further comprises:

providing information about the at least one portion of the table, wherein the information comprises one or more primary keys of the at least one portion of the table; and storing the information with the determined results in the data store.

11. The method of claim 8, wherein the maintaining the representation of the at least one portion of the table further comprises:

determining, at the transactional database, that a given transactional change of a given checkpoint with a transaction number identifier comprises one of the one or more incompatible data definition language commands, based, at least in part, on the determined results of the handshake protocol; and making, via a respective one of the at least one transport mechanism, updated snapshots of the at least one portion of the table accessible to the analytical database, based, at least in part, on the determined results of the handshake protocol, and wherein the updated snapshots have the transaction number identifier or a later transaction number identifier than the transaction number identifier.

12. The method of claim 8, wherein the maintaining the representation of the at least one portion of the table further comprises:

determining, at the analytical database, that a given transactional change of a given checkpoint with a transaction number identifier comprises one of the one or more incompatible data definition language commands, based, at least in part, on the determined results of the handshake protocol; and requesting, via a respective one of the at least one transport mechanism, updated snapshots of the at least one portion of the table, based, at least in part, on the determined results of the handshake protocol, and wherein the updated snapshots have the transaction number identifier or a later transaction number identifier than the transaction number identifier.

13. The method of claim 8, wherein:

responsive to storing the determined results of the handshake protocol, the plurality of snapshots are made accessible, via a respective one of the at least one transport mechanism, to the analytical database, based, at least in part, on the determined results of the handshake protocol; and a first transactional change of a first checkpoint of the checkpoints has a transactional number identifier less than or equal to a latest transactional number identifier of the plurality of snapshots.

14. The method of claim 8, wherein the at least one transport mechanism comprises:

a data storage service, accessible by the transactional database and the analytical database; or a data streaming service, accessible by the transactional database and the analytical database.

15. The method of claim 8, wherein:

responsive to the one or more computing devices configured to implement the transactional database coming back online after a period offline, confirming the determined results of the handshake protocol without reinitializing a new handshake protocol.

16. The method of claim 8, the method further comprising:

responsive to determining that another transport mechanism, wherein the other transport mechanism is different than the at least one transport mechanism, is to be used for providing the checkpoints, updating one or more of the determined results of the handshake protocol; or responsive to determining that there has been a change to the one or more data definition language commands that are incompatible with the checkpoints, updating one or more of the determined results of the handshake protocol.

17. One or more non-transitory, computer-readable storage media storing program instructions that when executed on or across one or more processors, cause the one or more processors to:

initiate a handshake protocol to maintain, at an analytical database, a representation of at least one portion of a table, stored at a transactional database, wherein:

the handshake protocol comprises:

determine a mapping for distributing respective portions of the transactional changes of the change-data-capture log to the one or more compute nodes of the node cluster, wherein:

the determining the mapping is based, at least in part, on a distribution of a plurality of snapshots, each snapshot comprising a segment of the at least one portion of the table, across one or more compute nodes of a node cluster of the analytical database; and the respective portions of the transactional changes comprise transactional changes organized into checkpoints, each corresponding to a respective one of the plurality of snapshots;

determine at least one transport mechanism for providing the plurality of snapshots and checkpoints from the transactional database to the analytical database, wherein the checkpoints comprise respective portions of a change-data-capture log for the at least one portion of the table; and determine one or more data definition language commands that are incompatible with the checkpoints; and store determined results of the handshake protocol in a data store accessible to the transactional database and the analytical database; and to maintain the representation of the at least one portion of the table comprises:

write, at the transactional database, transactional changes made to the at least one portion of the table to the change-data-capture log; and commit, at the analytical database, respective ones of the transactional changes of the checkpoints to the representation.

18. The one or more non-transitory, computer-readable storage media of claim 17, wherein the program instructions, when executed on or across the one or more processors, further cause the one or more processors to:

make, via the at least one transport mechanism, the plurality of snapshots accessible to the analytical database; and make, via the at least one transport mechanism, the checkpoints accessible to the analytical database.

19. The one or more non-transitory, computer-readable storage media of claim 17, wherein the maintain the snapshot of the at least one portion of the table further cause the one or more processors to:

determine, at the transactional database, that a given transactional change of a given checkpoint with a transaction number identifier comprises one of the one or more incompatible data definition language commands, based, at least in part, on the determined results of the handshake protocol; and make, via a respective one of the at least one transport mechanism, updated snapshots of the at least one portion of the table accessible to the analytical database, based, at least in part, on the determined results of the handshake protocol, and wherein the updated snapshots have the transaction number identifier or a later transaction number identifier than the transaction number identifier.

20. The one or more non-transitory, computer-readable storage media of claim 17, wherein the maintain the snapshot of the at least one portion of the table further cause the one or more processors to:

determine, at the analytical database, that a given transactional change of a given checkpoint with a transaction number identifier comprises one of the one or more incompatible data definition language commands, based, at least in part, on the determined results of the handshake protocol; and request, via a respective one of the at least one transport mechanism, updated snapshots of the at least one portion of the table, based, at least in part, on the determined results of the handshake protocol, and wherein the updated snapshots have the transaction number identifier or a later transaction number identifier than the transaction number identifier.

* * * * *